US011514123B2

(12) United States Patent
Gregori et al.

(10) Patent No.: US 11,514,123 B2
(45) Date of Patent: Nov. 29, 2022

(54) INFORMATION RETRIEVAL SYSTEM, METHOD AND COMPUTER PROGRAM PRODUCT

(71) Applicant: SAP SE, Walldorf (DE)

(72) Inventors: Lars Gregori, Munich (DE); Ketaki Raut, Munich (DE)

(73) Assignee: SAP SE, Walldorf (DE)

(*) Notice: Subject to any disclaimer, the term of this patent is extended or adjusted under 35 U.S.C. 154(b) by 91 days.

(21) Appl. No.: 17/126,332

(22) Filed: Dec. 18, 2020

(65) Prior Publication Data

US 2022/0171818 A1 Jun. 2, 2022

(30) Foreign Application Priority Data

Dec. 1, 2020 (EP) .................................... 20210873

(51) Int. Cl.
*G06F 16/9535* (2019.01)
*G06F 16/35* (2019.01)
(Continued)

(52) U.S. Cl.
CPC ...... *G06F 16/9535* (2019.01); *G06F 3/04883* (2013.01); *G06F 16/35* (2019.01); *G06N 3/08* (2013.01); *G06N 20/00* (2019.01)

(58) Field of Classification Search
CPC .. G06F 16/9535; G06F 16/35; G06F 3/04883; G06F 16/535; G06F 11/3438;
(Continued)

(56) References Cited

U.S. PATENT DOCUMENTS

2019/0102700 A1* 4/2019 Babu ...................... G06N 5/025
2019/0278870 A1* 9/2019 Novielli ................. G06N 20/00

FOREIGN PATENT DOCUMENTS

WO 2017/096099 A1 6/2017

OTHER PUBLICATIONS

Communication: "Extended European Search Report", dated May 26, 2021 (May 28, 2021), European Patent Office, for European Application No. 202108734-1231, 13 pages.

* cited by examiner

*Primary Examiner* — Evan Aspinwall
(74) *Attorney, Agent, or Firm* — Buckley, Maschoff & Talwalkar LLC

(57) ABSTRACT

An information retrieval system is provided. The system comprises: a client device, a server device connected to the client device, the server device being configured to retrieve information from a data storage, an artificial intelligence, AI, component, in communication with the client device, and the server device, and a feedback database accessible by the AI component, wherein the server device is configured to: receiving an input from a user of the client device, select at least one machine learning model, based at least in part on the input from the user, from among a plurality of machine learning models that are available for retrieving information from the data storage, retrieve information from the data storage using the at least one machine learning model, and provide at least a part of the retrieved information to the client device, and wherein the AI component is configured to: provide, for display at the client device, a graphical user interface, GUI, for the user to input user feedback on the retrieved information; receive the user feedback via the GUI, and store, in the feedback database, the received user feedback in association with the user and with the at least one machine learning model used for retrieving the information.

20 Claims, 12 Drawing Sheets

(51) Int. Cl.
*G06N 20/00* (2019.01)
*G06F 3/04883* (2022.01)
*G06N 3/08* (2006.01)

(58) Field of Classification Search
CPC .... G06F 2201/865; G06N 20/00; G06N 3/08; G06N 3/0454; G06N 3/0445
USPC ........................................................ 707/736
See application file for complete search history.

INFORMATION RETRIEVAL SYSTEM, METHOD AND COMPUTER PROGRAM PRODUCT

CROSS-REFERENCE TO RELATED APPLICATIONS

The present application claims priority to EP Application No. 20210873.4, filed Dec. 1, 2020, the contents of which are incorporated herein in their entirety for all purposes.

BACKGROUND

For retrieving information to be offered to a user, an artificial intelligence (AI) system including one or more machine learning models may be used. Machine learning models used for retrieving information may be of different types and/or employ different algorithms. In some circumstances, an AI system may have a plurality of machine learning models available for retrieving information.

SUMMARY

According to an aspect, the problem relates to improving information retrieval in case a plurality of machine learning models is available for information retrieval.

The problem is solved by the features disclosed by the independent claims. Further exemplary embodiments are defined by the dependent claims.

According to an aspect, an information retrieval system is provided. The system comprises:
  a client device;
  a server device connected to the client device, the server device being configured to retrieve information from a data storage;
  an artificial intelligence (AI) component, in communication with the client device and the server device; and
  a feedback database accessible by the AI component,
  wherein the server device is configured to:
    receive an input from a user of the client device;
    select at least one machine learning model, based at least in part on the input from the user, from among a plurality of machine learning models that are available for retrieving information from the data storage;
    retrieve information from the data storage using the at least one machine learning model; and
    provide at least a part of the retrieved information to the client device; and
  wherein the AI component is configured to:
    provide, for display at the client device, a graphical user interface (GUI) for the user to input user feedback on the retrieved information;
    receive the user feedback via the GUI; and
    store, in the feedback database, the received user feedback in association with the user and with the at least one machine learning model used for retrieving the information.

In various aspects and embodiments described herein, the client device and the server device may be connected via a network such as the Internet.

In various aspects and embodiments described herein, the AI component may be a plugin or an extension that is integrated with software functions relating to information retrieval by the server device.

In some exemplary embodiments, the AI component may be implemented on the client device (e.g., as a mobile application) or on the server device (e.g., as a web-based system). In other exemplary embodiments, the AI component may be implemented on a device (e.g., a computer) that is different from the client device and the server device.

In various aspects and embodiments described herein, the "data storage" may comprise one or more devices that store electronic data. The data storage may be implemented as a database, for example.

In some exemplary embodiments, the data storage may be implemented by cloud computing, where data centers are available to many users over the Internet. Cloud computing may be understood as a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

In various aspects and embodiments described herein, the data storage may store data of a single entity (e.g., corporation, organization, institution, etc.) or of a plurality of entities. For example, in some specific use cases, the data storage may store data relating to an electronic commerce (e-commerce) shop (in other words, online shop), e.g., information on products offered by the shop. Further, for example, in case the retrieval of information is performed by an Internet search engine or a web search engine, the data storage may be understood as storing any data that is accessible via the Internet by the Internet search engine or the web search engine.

In some exemplary embodiments, the data storage may store information relating to a plurality of items. Examples of the items may include, but are not limited to, websites, documents, products, services, facilities, venues for different kinds of activities, etc. In such exemplary embodiments, the retrieved information may comprise a list including one or more of the plurality of items and the user feedback may include at least one evaluation made by the user for at least one item included in the list. Further, in such exemplary embodiments, before providing at least a part of the retrieved information to the user, the one or more of the plurality of items included in the list may be sorted and/or filtered based on the user feedback that is stored in the feedback database in association with the user and that relates to the one or more of the plurality of items included in the list. For example, in case it can be seen from the user feedback stored in the feedback database that the user gave, in the past, lower evaluation to a particular item in the list than the other items in the list, the particular item may be excluded from the list or given low priority within the list. Further, for example, the items in the list may be arranged in an order according to the evaluations given by the user in the past to the items in the list.

In some exemplary embodiments, "retrieving information" from the data storage may be performed in response to a request from a user to search for some information in the data storage. In such cases, the request may comprise a search query and the retrieving of information may be performed according to the search query.

Additionally or alternatively, in some exemplary embodiments, "retrieving information" from the data storage may be performed without an explicit request from a user. For example, one or more pieces of information may be retrieved from the data storage and provided to the client device as one or more recommended pieces of information for the user. More specifically, in some specific use cases, information on products recommended to the user by an online shop may be retrieved from the data storage and provided to the user as recommendation, for example. In some other specific use cases, information on products and/or services offered by one or more shops (either online or physical) may be retrieved from the data storage and provided to the user as recommendation and/or advertisement, for example. Such information retrieval from the data storage for providing recommendations and/or advertisement may be performed, in some circumstances, also by an Internet search engine and/or a web search engine, in addition to providing the search results according to a search query input by the user.

In various aspects and embodiments described herein, the "machine learning model" may be understood as a mathematical model that receives input data, performs computation using the input data and outputs output data based on a result of the computation. In some exemplary embodiments, the input data to the machine learning model may comprise information according to which the retrieving of information from the data storage is performed. Further, in some exemplary embodiments, the output data from the machine learning model may comprise one or more pieces of information retrieved from (or to be retrieved from) the data storage in accordance with the input data. The computation performed by the "machine learning model" may vary depending on which machine learning algorithm is used for training the "machine learning model". Examples of the machine learning algorithm may include, but are not limited to, convolutional neural network and collaborative filtering.

A convolutional neural network may be a kind of deep neural networks. A convolutional neural network may have an input layer, multiple hidden layers and an output layer, where at least one of the hidden layers is a convolutional layer that convolves inputs from a previous layer and passes results of the convolution to a following layer. A convolutional neural network may be applied to recommender systems, image classification and/or recognition, natural language processing, etc. Further details on the convolutional neural network may be found, for example, Wikipedia, "Convolutional neural network", URL: https://en.wikipedia.org/wiki/Convolutional_neural_network.

Collaborative filtering may be a technique used by a recommender system and may be understood as a process of filtering for information or patterns using techniques involving collaboration among multiple agents, viewpoints, data sources, etc. Collaborative filtering may employ a memory-based approach, a model-based approach, a combination of memory-based and model-based approaches, or a deep-learning technique. In the memory-based approach, user rating data may be used to compute the similarity between users or items. In the model-based approach, models may be developed using different data mining, machine learning algorithms (e.g., Bayesian networks, clustering models, latent semantic models) to predict users' rating of unrated items. Further details on collaborative filtering may be found, for example, Wikipedia, "Collaborative filtering", URL: https://en.wikipedia.org/wiki/Collaborative_filtering.

According to the system of the above-stated aspect, at least one machine learning model to be used for the information retrieval is selected based at least in part on an input from the user and the user feedback on the retrieved information is stored in the feedback database in association with the user and with the at least one machine learning model used for retrieving the information. Thus, information retrieval can be customized for the user, according to the system of the above-stated aspect. Further, the user can have more control on how the information retrieval is performed.

In various aspects and embodiments described herein, the AI component may be further configured to train, using the user feedback, the at least one machine learning model used for retrieving the information. This can improve the information retrieval to be tailored to meet the requirements and/or expectations of the user.

In various aspects and embodiments described herein, in some circumstances, the input from the user may include identification information of the user. In such exemplary embodiments, the server device may be further configured to provide, for display at the client device, a GUI for the user to input the identification information of the user. This GUI may be, for example, a GUI for the user to input login information (e.g., username or user ID and a password) for logging in to the system according to the above-stated aspect.

In case the user does not provide his/her identification information to the system according to the above-stated aspect, the system may still identify the user with information that may be collected from the client device and/or a software application (e.g., mobile application, web browser, etc.) with which the user is accessing the system. In such a case, the system may collect the information from the client device and/or the software application in response to an instruction from the user to start using the system and the collected information may be considered as a part of the input from the user. Further, in such a case, the system may distinguish different users while the users may stay anonymous to the system.

In some exemplary embodiments, the server device may be further configured to, for receiving the input from the user, provide, for display at the client device, a GUI including a list of the plurality of machine learning model that are available for retrieving information from the storage device. In such exemplary embodiments, the input from the user may specify the at least one machine learning model to be selected for retrieving the information. In other words, in such exemplary embodiments, the user can specify which machine learning model to be used for retrieving the information.

Further, in some exemplary embodiments, the input from the user may include a search query and the retrieving of the information may be performed according to the search query. In such exemplary embodiments, the AI component may be further configured to modify the search query based on the user feedback stored in the feedback database and the retrieving of the information by the server device may be performed according to the modified search query. For example, one or more keywords in the search query may be replaced or modified according to preferences of the user for the past search results. Additionally or alternatively, one or more keywords may be added to the search query according to preferences of the user for the past search results.

In some exemplary embodiments, the selecting of the at least one machine learning model by the server device may be performed further based on a category of the information to be retrieved and/or the user feedback stored in the feedback database in association with the user who made the input.

In some exemplary embodiments, the AI component may be further configured to, when the user feedback from a plurality of users is stored in the feedback database, cluster the plurality of users based on the user feedback. In such exemplary embodiments, the selecting of the at least one machine learning model by the server device may be performed further based on which cluster the user who made the input belongs to. If, for example, a statistical calculation shows that feedback from a user cluster leads to an improvement in other clusters, the system can apply this improvement to the corresponding clusters, which may improve the overall system.

Further, in some exemplary embodiments, the server device may be configured to:
- when selecting the at least one machine learning model, select two or more machine learning models from among the plurality of machine learning models; and
- when providing at least a part of the retrieved information to the client device, provide two or more sets of the retrieved information, each of the two or more sets of the retrieved information being retrieved using one of the two or more machine learning models.

In the exemplary embodiments where two or more machine learning models are selected, the GUI provided for display at the client device by the AI component may include a list of the two or more machine learning models. Further, the user feedback may include: an evaluation made by the user for at least one of the two or more machine learning models; and/or preferences of the user for the two or more machine learning models.

Further, in some exemplary embodiments, the plurality of machine learning models that are available for retrieving information from the data storage may comprise one or more of the following:
- a category specific model that is trained with respect to a particular category of information stored in the data storage;
- a user specific model that is trained with respect to a particular user or a particular type of users;
- a recommended model that is recommended, by a user different from the user who made the input, to the user who made the input.

The AI component may be further configured to create the category specific model, the user specific model and/or the recommended model according to a transfer learning algorithm, based on an existing model, using the user feedback stored in the feedback database.

In the present disclosure, the "transfer learning algorithm" may be understood as a research problem in machine learning (ML) that focuses on storing knowledge gained while solving one problem and applying it to a different but related problem (see e.g., Wikipedia, "Transfer learning", URL: https://en.wikipedia.org/wiki/Transfer_learning). The details of the transfer learning algorithm can be found, for example, in Lin, Yuan-Pin; Jung, Tzyy-Ping (27 Jun. 2017). "Improving EEG-Based Emotion Classification Using Conditional Transfer Learning". Frontiers in Human Neuroscience. 11: 334. doi:10.3389/fnhum.2017.00334.

Further, in some exemplary embodiments where two or more machine learning models are selected from among the plurality of machine learning models, the server device may combine two or more sets of the retrieved information into a single set of information, each of the two or more sets of the retrieved information being retrieved by one of the two or more machine learning models. In such cases, when providing at least a part of the retrieved information to the user, the single set of information may be provided. In such exemplary embodiments, the two or more sets of the retrieved information may be combined into the single set of information according to a rule indicating how to combine the two or more sets of the retrieved information. For example, the rule may indicate which of the two or more sets of the retrieved information should be incorporated in the single set of information to which extent. The rule may be a specified (e.g., predetermined or predeterminable) rule or may be determined according to a further machine learning model that is trained using the user feedback.

According to another aspect, a computer-implemented method is provided for information retrieval. The method comprises:
- receiving, by a server device configured to retrieve information from a data storage, an input from a user via a client device connected to the server device;
- selecting, by the server device, at least one machine learning model, based at least in part on the input from the user, from among a plurality of machine learning models that are available for retrieving information from the data storage;
- retrieving, by the server device, information from the data storage using the at least one machine learning model;
- providing, by the server device, at least a part of the retrieved information to the client device;
- providing, by an AI component in communication with the client device and the server device, for display at the client device, a graphical user interface, GUI, for the user to input user feedback on the retrieved information;
- receiving, by the AI component, the user feedback via the GUI; and
- storing, by the AI component, in a feedback database accessible by the AI component, the received user feedback in association with the user and with the at least one machine learning model used for retrieving the information.

The method may further comprise: training, by the AI component, using the user feedback, the at least one machine learning model used for retrieving the information.

In some exemplary embodiments, the input from the user may include identification information of the user and the method may further comprise providing, for display at the client device, a GUI for the user to input the identification information of the user.

In some exemplary embodiments, the method may further comprise providing, by the server device for receiving the input from the user, for display at the client device, a GUI including a list of the plurality of machine learning model that are available for retrieving information from the storage device. In such exemplary embodiments, the input from the user may specify the at least one machine learning model to be selected for retrieving the information.

In some exemplary embodiments, the method may further comprise, when the user feedback from a plurality of users is stored in the feedback database, clustering, by the AI component, the plurality of users based on the user feedback. In such exemplary embodiments, the selecting of the at least one machine learning model by the server device is performed further based on which cluster the user who made the input belongs to.

Further, in some exemplary embodiments, two or more machine learning models may be selected by the server device from among the plurality of machine learning models. In such exemplary embodiments, when providing at least a part of the retrieved information to the client device, two or more sets of the retrieved information may be provided by the server device, each of the two or more sets of the retrieved information being retrieved using one of the two or more machine learning models. Further, in such exemplary embodiments, the GUI provided for display at the client device by the AI component may include a list of the two or more machine learning models and the user feedback may include: an evaluation made by the user for at least one of the two or more machine learning models; and/or preferences of the user for the two or more machine learning models.

In some exemplary embodiments, the plurality of machine learning models that are available for retrieving information from the data storage may comprise one or more of the following:
- a category specific model that is trained with respect to a particular category of information stored in the data storage;
- a user specific model that is trained with respect to a particular user or a particular type of users;
- a recommended model that is recommended, by a user different from the user who made the input, to the user who made the input.

The category specific model, the user specific model and/or the recommended model may be created according to a transfer learning algorithm, based on an existing model, using the user feedback stored in the feedback database.

According to yet another aspect, a computer program product is provided. The computer program product comprises computer-readable instructions that, when loaded and run on a computer, cause the computer to perform the method according to any one of the above-stated aspect and exemplary embodiments.

According to various aspects and embodiments described herein, an individual machine learning model for a particular user may be generated. This may reduce the risk that a user will negatively influence the whole system, e.g. by choosing the wrong items (e.g., products) on purpose.

The subject matter described in the application can be implemented as a method or as a system, possibly in the form of one or more computer program products. The subject matter described in the application can be implemented in a data signal or on a machine readable medium, where the medium is embodied in one or more information carriers, such as a CD-ROM, a DVD-ROM, a semiconductor memory, or a hard disk. Such computer program products may cause a data processing apparatus to perform one or more operations described in the application.

In addition, subject matter described in the application can also be implemented as a system including a processor, and a memory coupled to the processor. The memory may encode one or more programs to cause the processor to perform one or more of the methods described in the application. Further subject matter described in the application can be implemented using various machines.

BRIEF DESCRIPTION OF THE DRAWINGS

Details of one or more implementations are set forth in the exemplary drawings and description below. Other features will be apparent from the description, the drawings, and from the claims. It should be understood, however, that even though embodiments are separately described, single features of different embodiments may be combined to further embodiments.

DETAILED DESCRIPTION

Figure 1:
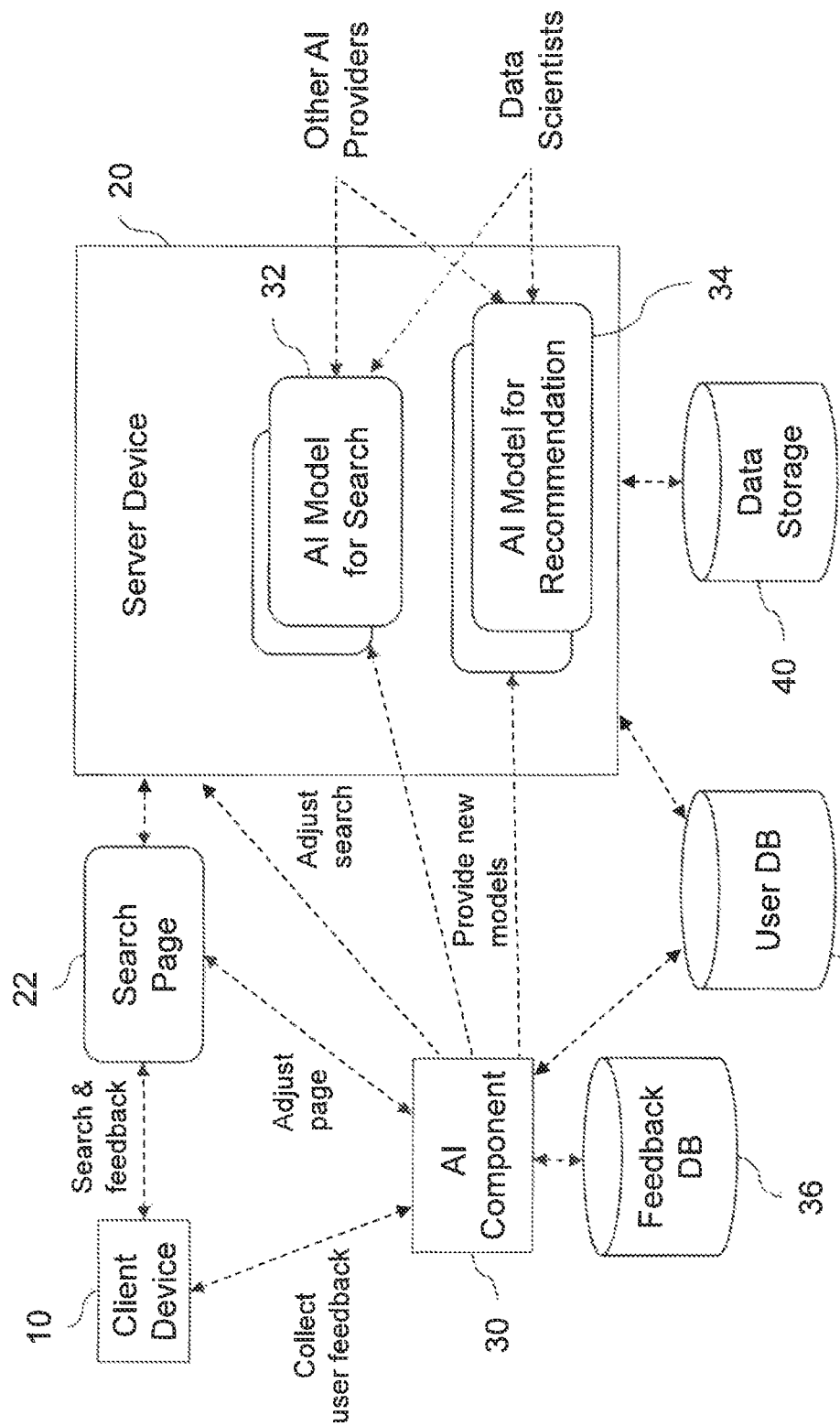
FIG. 1 shows a functional block diagram of an exemplary system according to the present disclosure.

In the following text, a detailed description of examples will be given with reference to the drawings. It should be understood that various modifications to the examples may be made. In particular, one or more elements of one example may be combined and used in other examples to form new examples.

The following describes exemplary embodiments in relation to an exemplary use case involving e-commerce, where search and/or recommendation of products may be performed by an e-commerce software application. It should be understood, however, that the exemplary embodiments may be applicable also to other use cases where information retrieval is performed. For instance, the exemplary embodiments may be applicable to information search by an Internet search engine or a web search engine. Further, the information to be retrieved (e.g., searched) may be of different types, for instance, images, videos, audio data (e.g., music) and/or text information (e.g., news, documents, etc.).

Today, in an e-commerce system, one or more AI systems can be used to offer a user, for example, a product that the user may be most interested in. Machine learning models used by an application of the e-commerce system may employ different algorithms and types. The product recommendation, for example, may determine products based on other product purchases or a trained convolutional neural network or similar product criteria (e.g. color of the products). The system may try to find the product recommendation based on a machine learning model. In a multi-machine learning environment, where a system does not use a single machine learning model but uses a plurality of machine learning models, the system itself may search for the best model (e.g., which can provide a product recommendation that best suits the interest of the user) to make a product recommendation. However, the user often does not have the possibility to select his/her own best model to influence the result.

For example, an e-commerce system may use a machine learning model determined by A/B testing or by machine learning algorithms. However, in most cases, the user does not know which model an application of the e-commerce system uses. In some circumstances, the application may even try to hide the AI having the machine learning model so that the user does not notice where the system is using an AI. For example, the application may display different product images and/or categories being arranged differently for different users. Such different results may be confusing for these users in case these users see the different results of each other.

With a system and/or method according to the present disclosure, a user may have the possibility to give feedback on the retrieved information, e.g. whether the search result and/or the product recommendation meet(s) his/her expectations or not. Moreover, in a multi-machine learning environment, in some circumstances, alternative search and/or recommendation results obtained using one or more further machine learning models may also be displayed. Based on this, the user can evaluate the results and put the machine learning models into relation (e.g. model D is better than B). The user may have a machine learning model that best fits to the user and the training of the machine learning model can also be improved on feedback of the user. Additionally, the process of search and/or recommendation may be more transparent to users. In other words, users may be given the opportunity to understand and control AI by building trust and maintaining transparency.

System Configuration

FIG. 1 shows a functional block diagram of an exemplary system according to the present disclosure. In the specific example shown in FIG. 1, the exemplary system comprises a client device 10, a server device 20, an AI component 30, a feedback database (DB) 36 and a user DB 38.

The client device 10 may be a computer used by a user. For example, the client device 10 may be a mobile device such as a mobile phone (e.g. smartphone), a tablet computer, a laptop computer, etc. In some other examples, the client device 10 may be a personal computer. The client device 10 may be configured to access the server device 20 for the user to use one or more functions provided by the server device 20.

The sever device 20 may be configured to provide one or more functions to other devices including the client device 10. The server device 20 may be connected to the client device 10 via a network (not shown) such as the Internet. The server device 20 may be configured to retrieve information from a data storage 40. More specifically, the server device 20 may be configured to receive an input from a user of the client device 10 and select at least one machine learning model, based at least in part on the input from the user, from among a plurality of machine learning models that are available for retrieving information from the data storage 40. The server device 20 may be further configured to retrieve information from the data storage 40 using the at least one selected machine learning model and provide at least a part of the retrieved information to the client device 10. The server device 20 may be implemented with one or more computers.

The data storage 40 may comprise one or more devices that store electronic data. The data storage 40 may be implemented as a database, for example. In some exemplary embodiments, the data storage 40 may be implemented by cloud computing, where data centers are available to many users over the Internet. In the specific example shown in FIG. 1, the data storage 40 stores information relating to a plurality of items such as products offered by one or more e-commerce shops. It should be understood, however, in various embodiments and examples as described herein, the data storage 40 may store, additionally or alternatively, other kinds of information that may be retrieved and provided to the user.

In the specific example shown in FIG. 1, the server device 20 is configured to search information on one or more products, in response to a request from the user of the client device 10. The request may include a search query concerning the one or more products. Further, in the specific example shown in FIG. 1, the server device is configured to retrieve information of one or more products with or without an explicit request from the user and provide the retrieved information as recommendation of the one or more products. Accordingly, in the specific example shown in FIG. 1, the server device 20 comprises one or more AI models 32 for search and one or more AI models 34 for recommendation as the plurality of machine learning models that are available for retrieving information from the data storage 40. Each of the AI models 32, 34 for search and recommendation may comprise a machine learning model of a particular kind. A machine learning model may be a mathematical model that receives input data, performs computation using the input data and outputs output data based on a result of the computation. In the specific example shown in FIG. 1, the input data for a machine learning model comprised in the AI model 32 or 34 may be, for example, previous interest in products, previous search, evaluations on previous search and/or recommendation results, etc. The output may be, for example, a list of products and/or predictions of the likelihood that one or more products will be of interest for the user (or will be purchased by the user). The computation performed by the machine learning model may be based on a machine learning algorithm such as convolutional neural network and collaborative filtering. In some circumstances, at least some of the different AI models 32, 34 may be based on different types of machine learning algorithms. Additionally or alternatively, at least some of the different AI models 32, 34 may be based on the same machine learning algorithm but have different sets of parameters obtained by training with different sets of training data.

In some exemplary embodiments, the AI models 32 and 34 may include one of more of the following:
 a category specific model that is trained with respect to a particular category of information stored in the data storage 40;
 a user specific model that is trained with respect to a particular user or a particular type of users (in other words, a particular group or cluster of users);
 a recommended model that is recommended, by a user different from the user who made the input, to the user who made the input.

In some circumstances, an AI model may be considered as both category specific and user specific. For example, an AI model may be assigned to a particular user or user group for retrieval of information in a particular category.

Each of the AI models 32, 34 may be identified by a unique value (e.g., a model ID) and this unique value may be used for selecting the AI model by the user and/or the server device 20. In some circumstances, the unique value of an AI model may be provided to a user from the server device 20 and/or another user by providing a link (e.g., a URL having a format such as: https://example.com/yourai?yaimodel=id2309) including the unique value. When the user who has received the link opens the link, the unique value may be passed to the server device 20 to select the AI model, for example. The "recommended model" as mentioned above may be an AI model that is recommended by a user for another user by communicating the unique value of the AI model from the client device 10 of the user to the client device 10 of the other user, for example.

At least some of the AI models 32, 34 for search and recommendation may be provided to the server device 20 by the AI component 30, as will be described below more in detail. Other AI providers and/or data scientists may also provide at least some of the AI models 32, 34 for search and recommendation to the server device 20.

As shown in FIG. 1, the server device 20 may provide a search page 22 to the client device 10 for receiving one or more user inputs concerning search and/or recommendation performed by the server device 20 and for providing the user with results of the search and/or recommendation performed by the server device 20.

Specifically, for example, the search page 22 may provide one or more GUIs for receiving user inputs and for providing information relevant to the search and/or recommendation. In some exemplary embodiments, the search page 22 may be implemented as a web page shown by a web browser of the client device 10. Additionally or alternatively, for example, the search page 22 may be implemented as an application (e.g., mobile application) on the client device 10, separately from the web browser of the client device 10.

In some exemplary embodiments, the input from the user based on which the server device 20 can select the at least one machine learning model may include identification information of the user. In some circumstances, the server device 20 may be configured to provide, for display at the client device 10, a GUI for the user to input the identification information of the user. Such a GUI may be, for example, a GUI for the user to input login information for logging in to use the search page 22 and may be provided within or in association with the search page 22. In the present disclosure, the GUI provided "in association with" the search page 22 may be understood that the GUI is not necessarily integrated within the search page 22 but is provided in a manner which is evident for the user that the GUI is related to the search page 22 (e.g., the GUI may be displayed on top of the search page 22, with a partial overlap with the search page 22, etc.). Additionally or alternatively, the server device 20 may identify the user with information that may be collected from the client device 10 and/or a software application running on the client device 10 to provide the search page 22. In such a case, the server device 20 may collect the information from the client device 10 and/or the software application in response to an instruction from the user to start using the search page 22 and the collected information may be considered as a part of the input from the user. This way, the server device 20 may distinguish different users even when the users do not explicitly provide their identification information to the server device 20 (in other words, the users may stay anonymous to the server device 20).

In some exemplary embodiments, the server device 20 may be further configured to, for receiving the input from the user, provide, for display at the client device 10, a GUI including a list of the plurality of machine learning model that are available for retrieving information from the storage device 40. The GUI may include, for example, a list of AI models 32 for search and/or a list of AI models 34 for recommendation. The user may select at least one of the AI models 32 for search and/or at least one of the AI models 34 for recommendation. The input from the user may then specify the selected AI model(s) 32 for search and/or the selected AI model(s) 34 for recommendation. The selected AI model(s) 32 and/or 34 may be respectively used by the server device 20 for search and/or recommendation.

In case two or more AI models 32 for search (and/or two or more AI models 34 for recommendation) are selected by the user, the server device 20 may provide to the client device 10 two or more sets of search results (and/or two or more sets of recommendation results) obtained using the two or more AI models 32 for search (and/or two or more AI models 34 for recommendation). The user can then compare the two or more sets of search results (and/or the two or more sets of the recommendation results).

In some exemplary embodiments, the server device 20 may be further configured to assign one or more AI models 32, 34 to retrieve information for a particular user. In case the user himself/herself selects the one or more AI models 32, 34 as stated above, the server device 20 may simply assign, to the user, the one or more AI models 32, 34 selected by the user. In case the user has not made the selection, the server device 20 may determine which AI model(s) to assign to the user, based on information relating to the user and/or categories of information to be retrieved, for example.

In some exemplary embodiments, the server device 20 may be further configured to store, in the user DB 38, information indicating which AI model or models has or have been assigned to the user. The user DB 38 may be a database that is accessible by the server device 20 and that stores information relating to users of services offered by the server device 20. For example, the user DB 38 may store, for each user, user identification information, attribute data (e.g., gender, age, contact information, etc.) and/or history data (e.g., including past search request(s) from the user, results of past search(es) and/or recommendation(s) performed for the user, etc.). At least a part of the data stored in the user DB 38 may be accessible also by the AI component 30. In particular, the assignment of one or more AI model(s) to the users stored in the user DB 38 may be accessible by the AI component 30. The data stored in the user DB 38 may be used for training one or more of the AI models 32, 34 as will be described later below. It is noted that, although in FIG. 1 the user DB 38 is shown as a separate entity from the server device 20, in some exemplary embodiments, the user DB 38 may be a part of the server device 20.

Further details of functions of the server device 20 will be described later below with reference to FIGS. 6 and 8 that show exemplary processes performed at the exemplary system shown in FIG. 1.

The AI component 30 may be in communication with the client device 10 and the server device 20. The AI component 30 may be configured to provide, for display at the client device 10, a GUI for the user to input user feedback on the information retrieved by the server device 20. For example, the AI component 30 may provide such a GUI within or in association with the search page 22 provided by the server device 20. The AI component 30 may be further configured to receive the user feedback via the GUI and store, in the feedback DB 36, the received user feedback in association with the user and with the at least one machine learning model (e.g., AI model(s) 32 for search and/or AI model(s) 34 for recommendation) used for retrieving the information. In other words, the AI component 30 may be configured to collect user feedback with regards to the information retrieved by the server device 20. The AI component 30 may be further configured to train, using the user feedback, the at least one machine learning model used for retrieving the information.

The feedback DB 36 may be a database accessible by the AI component 30 for storing the user feedback collected by the AI component 30.

The user feedback collected by the AI component 30 may include, for example, in case a list of items (e.g., products) is shown on search page 22 as a result of information retrieval by the server device 20, at least one evaluation made by the user for at least one item included in the list. Such user feedback including evaluation(s) made by the user for one or more items may be later used for sorting and/or filtering items included in a list to be shown as a result of information retrieval. For example, in case it can be seen from the user feedback stored in the feedback database 36 that the user gave, in the past, lower evaluation to a particular item in the list than the other items in the list, the particular item may be excluded from the list or given low priority within the list. Further, for example, the items in the list may be arranged in an order according to the evaluations given by the user in the past to the items in the list.

In case the server device 20 provides two or more sets of retrieved information (e.g., search results and/or recommendation results) obtained using two or more machine learning models (e.g., two or more AI models 32 for search and/or two or more AI models 34 for recommendation), the GUI provided for display at the client device 10 by the AI component 30 for inputting user feedback may include a list of the two or more machine learning models. In this case, the user feedback may include an evaluation made by the user for at least one of the two or more machine learning models and/or preferences of the user for the two or more machine learning models.

As can be seen from FIG. 1, in this specific example, the AI component 30 may be further configured to adjust the search page 22 with respect to user feedback. For example, the AI component 30 may provide, within or in association with the search page 22, a GUI for receiving a confirmation by a user of the client device 10 whether or not the user wishes to provide feedback on search and/or recommendation results obtained using selected machine learning model or models. Further, for example, the AI component 30 may be configured to provide, within or in association with the search page 22, a GUI for the user to input the user feedback as described above only when the user has confirmed that the user wishes to provide such feedback.

Further, in the specific example shown in FIG. 1, the AI component 30 may be configured to adjust the search performed by the server device 20. For example, the AI component 30 may be configured to sort and/or filter search results obtained by the server device 20 according to the user feedback stored in the feedback DB 36. Further, for example, the AI component 30 may modify a search query that is included in an input from the user and that is received by the server device 20. Modifications to the search query may be performed based on the user feedback stored in the feedback DB 36. For instance, one or more keywords in the search query may be replaced or modified according to preferences of the user for the past search results. Additionally or alternatively, one or more keywords may be added to the search query according to preferences of the user for the past search results. As a specific, non-limiting example, a keyword, "shoe", in the search query may be replaced with "sports-shoe" and a term, "red shoelace", may be added to the search query. The server device 20 may perform search in the data storage 40 according to the modified search query. In some circumstances, the adjustment (in other words, modification(s)) to the search query may be transparent (e.g., visible) for the user by providing, for display at the client device 10, the modified search query. For instance, the differences may be highlighted and further information on the adjustment may be offered (e.g., with mouse over) that one or more keywords were added, replaced and/or deleted based on previous search and feedback requests.

Further, in some exemplary embodiments, when the user feedback from a plurality of users is stored in the feedback database 36, the AI component 30 may be configured to cluster the plurality of users based on the user feedback. For example, the clustering of the users may be performed based on user feedback for the same or similar search results. As a specific example, assume that three users 1, 2 and 3 have searched for "red shoes". Users 1 and 2 like the results for products A and B, while user 3 likes the results for products B and C. In such a situation, users 1 and 2 may be clustered into a same cluster (or group). The AI component 30 may be further configured to store, in the user DB 38, information indicating which user(s) belong to which user clusters or groups.

Additionally or alternatively, in some circumstances, users may be clustered according to their attribute information such as interests.

The user clusters or groups may be used by the server device 20 for selecting which AI model to use.

Further, in some exemplary embodiments, the AI component 30 may be configured to create new machine learning models (e.g., AI models 32 for search and/or AI models 34 for recommendation) using the user feedback stored in the feedback database 36. In some circumstances, for example, a new machine learning model may be created according to a transfer learning algorithm, based on an existing model, using the user feedback stored in the feedback database 36.

Transfer learning may be defined in terms of domains and tasks. A domain $\mathcal{D}$ consists of two components: a feature space $\mathcal{D}$ and a marginal probability distribution P(X), where X={$x_1, \ldots, x_n$}∈$\mathcal{D}$. Given a specific domain, a task T consists of two components: a label space $\mathcal{Y}$ and an objective predictive function $f: \mathcal{D} \rightarrow \mathcal{Y}$. The task T may be denoted by T={$\mathcal{Y}, f(x)$} and may be learned by training data consisting of pairs {$x_i, y_i$}, where $x_i \in \mathcal{D}$ and $y_i \in \mathcal{Y}$. The function $f$ may be used for predicting the corresponding label $f(x)$ of a new instance x. Given a source domain $\mathcal{D}_S$ and a source learning task $T_S$ as well as a target domain $\mathcal{D}_T$ and a target learning task $T_T$, where $\mathcal{D}_S \neq \mathcal{D}_T$ or $T_S \neq T_T$, transfer learning can help improve the learning of the target predictive function $f_T(\bullet)$ in the target task $T_T$, using the source domain $\mathcal{D}_S$ and the source learning task $T_S$. For further details of the transfer learning algorithm, see e.g., Lin, Yuan-Pin; Jung, Tzyy-Ping (27 Jun. 2017). "Improving EEG-Based Emotion Classification Using Conditional Transfer Learning". Frontiers in Human Neuroscience. 11: 334. doi:10.3389/fnhum.2017.00334.

In the exemplary embodiments where the AI component 30 creates a new AI model according to the transfer learning algorithm, the source domain and the source task in the transfer learning as stated above may be derived from an existing model. The target domain and the target task in the transfer learning as stated above may correspond to the new AI model to be created. For example, the new AI model may be directed to a particular user or user group and/or to a particular category of information to be retrieved. In some examples, the existing model may be a general model used for all types of users and categories of information. In some other examples, the existing model may be a user specific model and/or a category specific model and the new AI model may be directed to a different user or user group and/or to a different category. The existing model may have been trained with history user data (e.g., stored in the user DB 38) and the new AI model may be created based on the existing model and trained using the user feedback stored in the feedback DB 36 according to the transfer learning algorithm. With the transfer learning algorithm, smaller amount of training data may be required for training the new AI model and, thus, the new AI model may be created faster than it has taken for training the existing model.

In case no model is available as the existing model for the transfer learning algorithm as stated above (e.g., no history user data available due to an application to a new field), the AI component 30 may need to collect data for creating an AI model (e.g., a general model). Examples of the data to be collected may include, but are not limited to, search queries, bought products, user feedback, etc. The AI component 30 may create a general model based on the collected data, for example.

As stated above, the user clusters may be used for selecting which AI models to use. For example, if one of the users in the same cluster already has his/her own model, then this model could be assigned to the other users in the group. If the remaining feedback does not deviate, then a new model may be created for the group of users and the model may contain the additional feedback. If the feedback deviates in another category, then the model may be used as a base and a new model for the other users may be created and adjusted. However, the feedback of the same domain could extend the base model with additional data. In some further examples, for a specific category, a new model may be created and this model may be assigned to the group of users for this category. In other categories the group of users may use their own models or share other category specific models. This may allow that a category specific model can be extended and "grow". With the user feedback on this category specific model, the system can identify if this model works. In case it does not, the user may be unassigned from this category specific model. Another category specific model may fit better, or the user may stay on his/her own model, which could also learn from the negative feedback of the common category specific model.

The AI component 30 may be implemented as a plugin or an extension which can integrate in an existing system (e.g., an existing e-commerce system, an existing search engine, etc.). In some exemplary embodiments, the AI component 30 may be implemented on the client device 10 (e.g., as a mobile application) or on the server device 20 (e.g., as a web-based system). In other exemplary embodiments, the AI component 30 may be implemented on a device (e.g., a computer) that is different from the client device 10 and the server device 20.

It should be noted that the configuration of the exemplary system shown in FIG. 1 is merely an example and the exemplary system may have a configuration different from that shown in FIG. 1. For instance, the exemplary system may comprise more than one client device 10 and/or more than one server device 20. In case more than one server device 20 is comprised in the exemplary system, the server devices 20 may provide different kinds of services, e.g., different online shops, different information search services, etc.

Exemplary Processes

Figure 2:
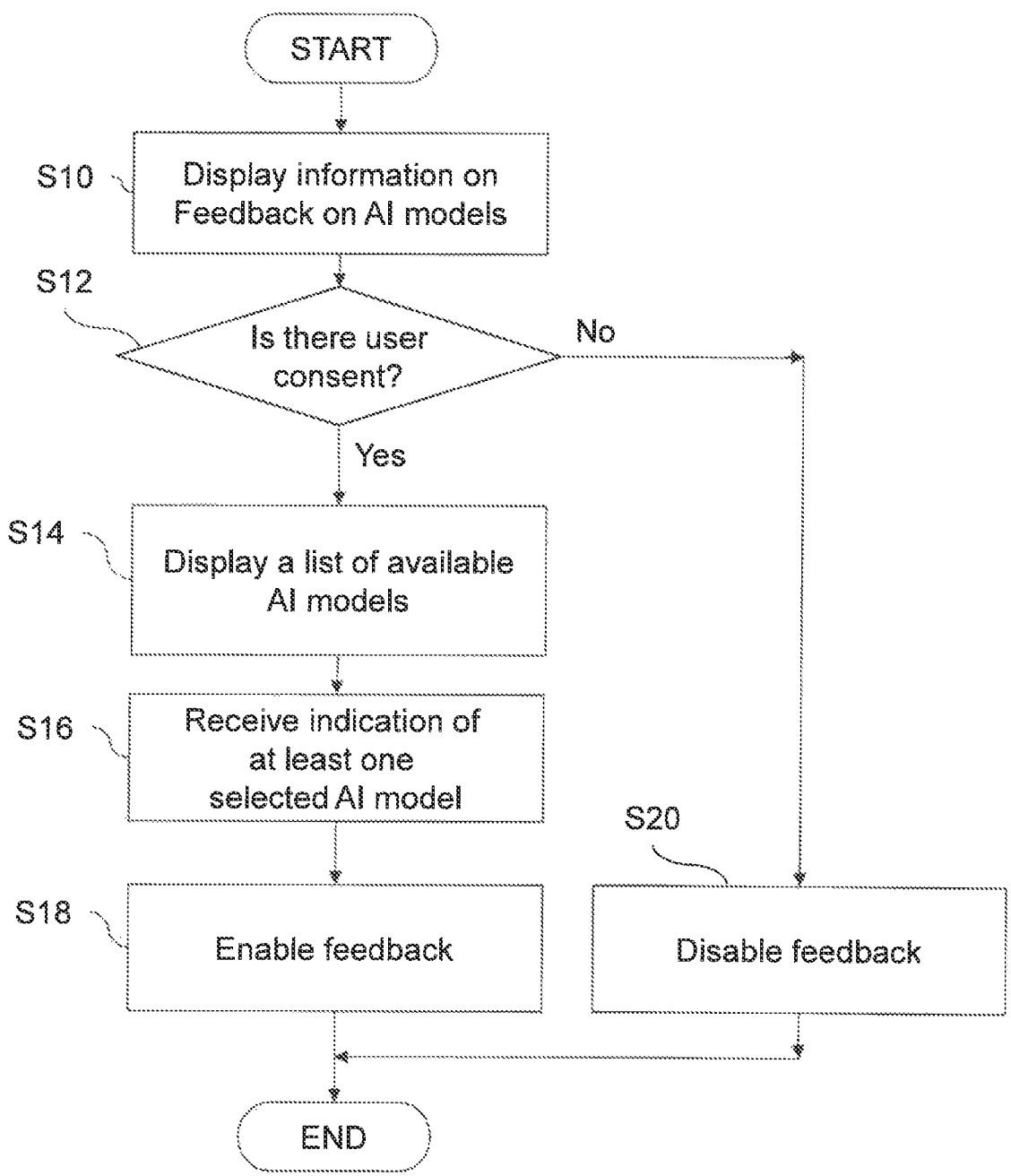
FIG. 2 shows a flowchart of an exemplary process performed at the system shown in FIG. 1.

FIG. 2 shows a flowchart of an exemplary process performed at the system shown in FIG. 1. The exemplary process shown in FIG. 2 may be performed by the AI component 30. The exemplary process shown in FIG. 2 may start, for example, when a user of the client device 10 inputs a user instruction to start using the information retrieval function of the server device 20, e.g., to start using the search page 22. The AI component 30 may start the exemplary process shown in FIG. 2 when notified of the user instruction by the client device 10 and/or the server device 20, for example.

At step S10, the AI component 30 may display, on the client device 10, information on feedback on AI models. For example, the AI component 30 may provide a GUI for display within or in association with the search page 22 in order to notify the user of the client device 10 that the system uses AI (e.g., for the search and/or recommendation) and that the user can provide feedback on the AI and/or create his/her own machine learning model. The GUI may also include an input element (e.g., button, checkbox, etc.) for the user to indicate his/her consent to provide the feedback.

Figure 3:
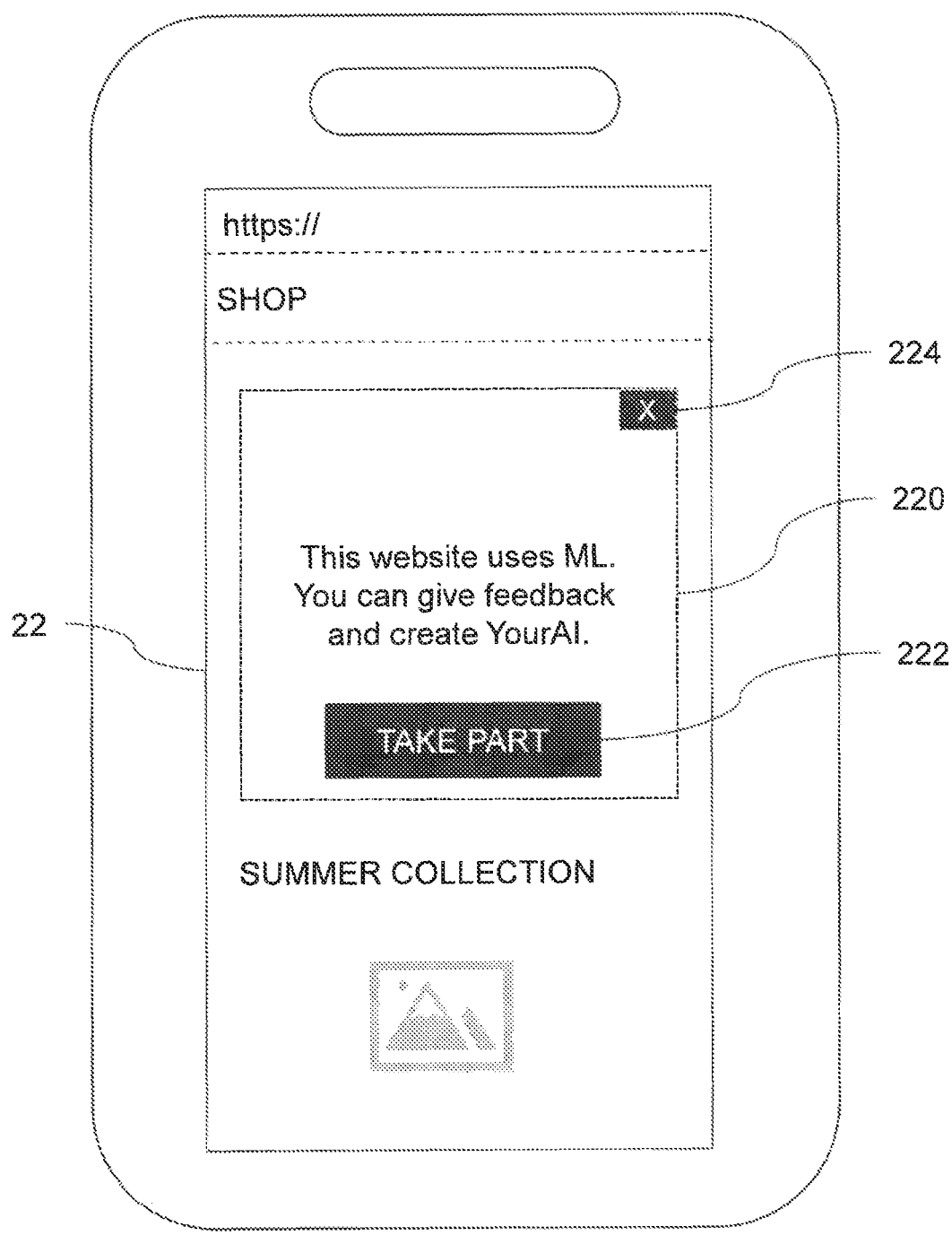
FIGS. 3 to 5 show examples of GUIs that may be provided for display during the exemplary process shown in FIG. 2.

FIG. 3 shows an example of the GUI that may be provided for display at the client device 10 at step S10 of the exemplary process shown in FIG. 2. Referring to FIG. 3, in this specific example, a GUI 220 is shown within a search page 22. The GUI 220 includes notification on the feedback system, a button 222 indicating "TAKE PART" and a cancel button 224. The user may indicate his/her consent for providing feedback by pressing the button 222. In case the user does not wish to provide feedback, the user may press the cancel button 224 without pressing the button 222, for example. After the user presses the button 222 or the cancel button 224, the GUI 220 may disappear.

Referring again to FIG. 2, at step S12, the AI component 30 may determine whether the user has made an input indicating consent of the user to participate in the feedback system. For example, the AI component 30 may determine that the user has made an input indicating the consent in case the user has pressed a button corresponding to the indication of consent in the GUI provided for display at step S10 (e.g., the button 222 in the GUI 220 shown in FIG. 3). Further, for example, the AI component 30 may determine that the user has not made an input indicating the consent in case the user has pressed a button corresponding to an indication of refusal in the GUI provided for display at step S10 (e.g., the cancelation button 224 in the GUI shown in FIG. 3) and/or in case a specified time has lapsed after the display of the information on the feedback system at step S10 without the user pressing the button corresponding to the indication of consent.

If it is determined that the user has made an input indicating the consent (Yes at step S12), the exemplary process may proceed to step S14.

At step S14, the AI component 30 may display, on the client device 10, a list of AI models that are available for retrieving information from the data storage 40. For example, the AI component 30 may communicate with the server device 20 and receive a list of AI models 32, 34 that are available for the server device 20. The AI component 30 may then provide, for display at the client device 10 (e.g., within or in association with the search page 22), a GUI including the list of available AI models 32, 34 received from the server device 20. In some exemplary embodiments, the AI component 30 may display one or more lists of available AI models 32 for search and one or more lists of available AI models 34 for recommendation. Further, in some exemplary embodiments, the AI component 30 may display different lists of AI models 32, 34 for search and/or recommendation, each of the different lists corresponding to different categories of items (e.g., products) subject to search and/or recommendation. In some exemplary embodiments, the AI component 30 may request the server device 20 to perform step S14 and the step S14 may be performed by the server device 20.

Figure 4:
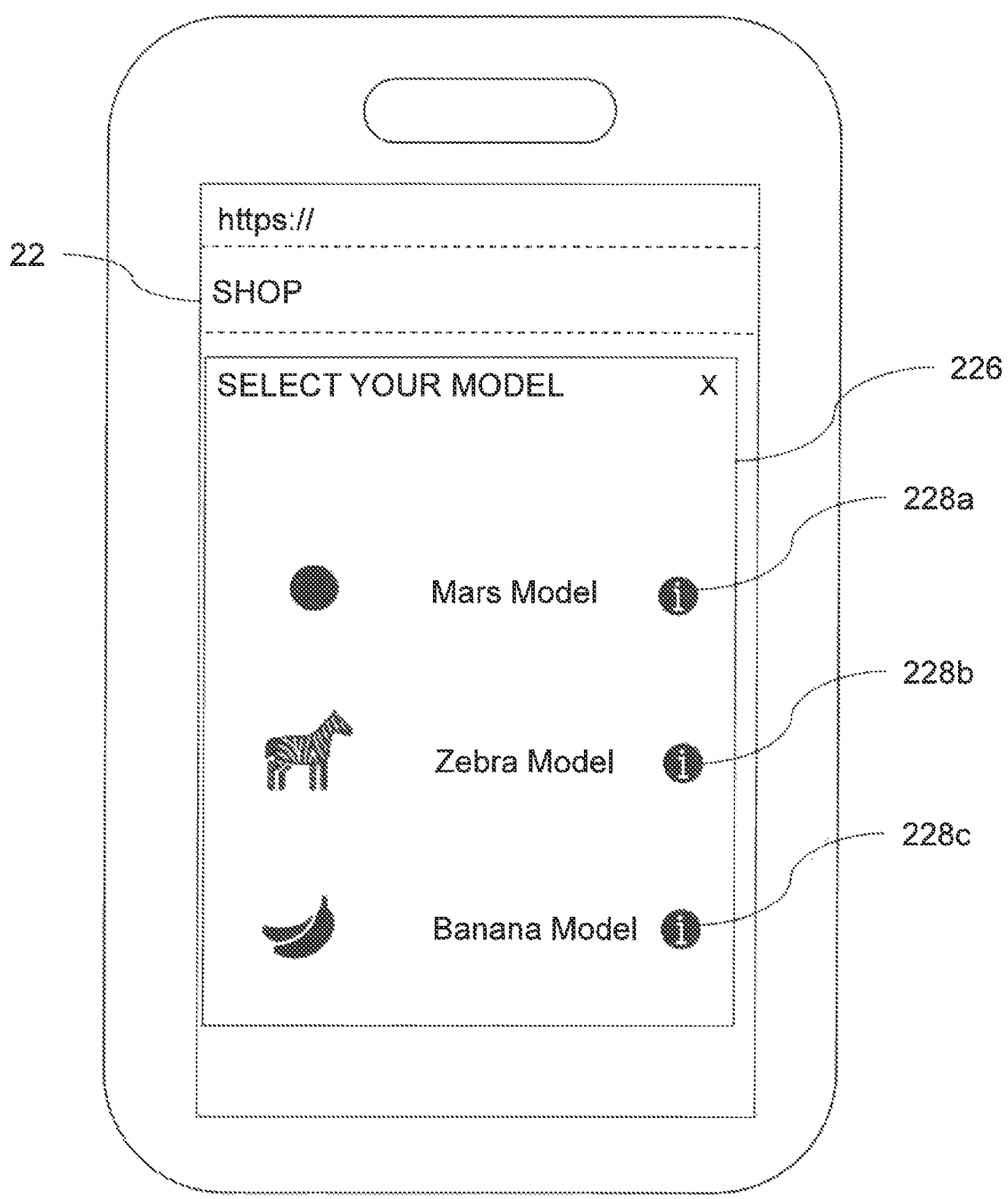

FIG. 4 shows an example of the GUI that may be provided for display at the client device 10 at step S14 of the exemplary process shown in FIG. 2. In the specific example of FIG. 4, the GUI 226 shows "Mars Model", "Zebra Model" and "Banana Model" as available AI models for product search. Further, in the GUI 226, information buttons 228a, 228b and 228c are provided for the "Mars Model", "Zebra Model" and "Banana Model", respectively. When the user clicks on the information button(s) 228a, 228b and/or 228c, further explanations on the corresponding model(s) may appear on the display. As in the specific example of FIG. 4, the GUI 226 does not necessarily provide technical details of each model. Rather, the GUI 226 may provide information of each model in a simple form and in a user-friendly, amusing manner. For example, the "Zebra Model" may be explained as a machine learning model that is trained with gray scale and that will search (and/or recommend) products that are black, white and/or gray in color. Further, for example, the "Banana Model" may be explained as a machine learning model that is trained with warm colors and that will search (and/or recommend) products that are red, orange, yellow, etc. in color. Such naming and/or explanations for the AI models may lead to a better understanding of the model characteristics by the users.

Figure 5:
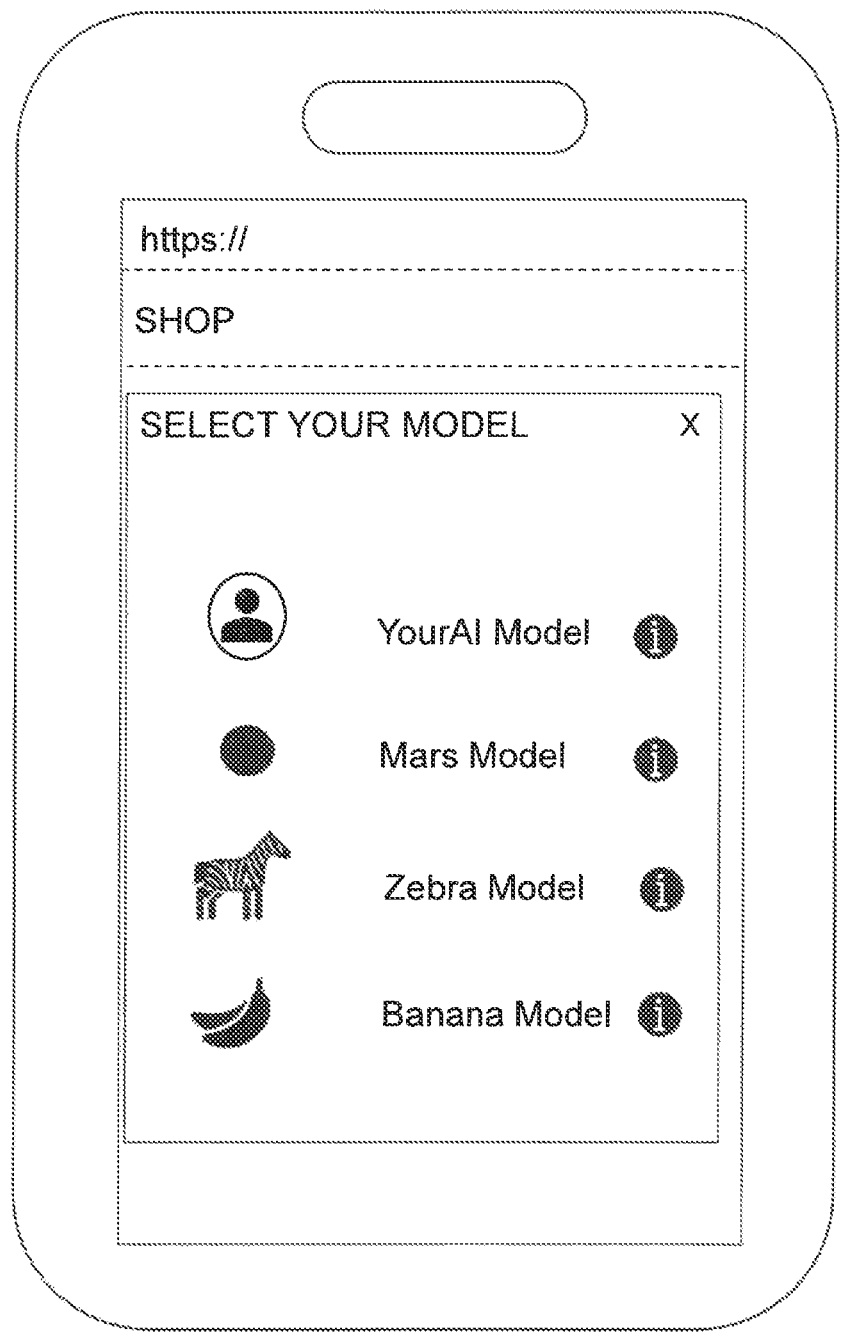

FIG. 5 shows another example of the GUI that may be provided for display at the client device 10 at step S14 of the exemplary process shown in FIG. 2. The list of available AI models shown in the exemplary GUI shown in FIG. 5 includes, in addition to the AI models shown in the exemplary GUI of FIG. 4, "YourAI model" that is created for and/or assigned to the particular user of the client device 10.

Referring again to FIG. 2, at step S16, the AI component 30 may receive indication of at least one selected AI model. For example, the user may make an input to select at least one of the AI models that are displayed at step S14 via the GUI including the list of available AI models (see e.g., FIGS. 4 and 5). The AI component 30 may store the selection made by the user in the user DB 38 and optionally also in the feedback DB 36. The AI component 30 may notify the selection made by the user to the server device 20.

Next, at step S18, the AI component 30 may enable feedback. For example, the AI component 30 may store, in the feedback DB 36 and/or in the user DB 38, a flag indicating that the user wishes to provide feedback on the AI models. The exemplary process may end after step S18.

If it is determined that the user has not made an input indicating consent to participate in the feedback system (No at step S12), the exemplary process may proceed to step S20 and the AI component 30 may disable feedback. For example, the AI component 30 may store, in the feedback DB 36 and/or in the user DB 38, a flag indicating that the user does not wish to provide feedback on the AI models. The exemplary process may end after step S20.

In some exemplary embodiments, the AI component 30 may skip steps S14 and S16 for the user to select at least one AI model from a list of available AI models, when performing the exemplary process shown in FIG. 2. In such exemplary embodiments, the AI component 30 may perform steps S14 and S16 when the user makes an input indicating that the user wishes to select at least one AI model from the list of available AI models, for example. In such exemplary embodiments, a default AI model may be assigned by the server device 20 to perform information retrieval for the user until the user makes the selection of at least one AI model. The default AI model may be a general model that is used by the server device 20 for product search or recommendation, for example. In some examples, the default AI model may be a category specific model that is trained for the category of the products to be searched or recommended.

After performing the exemplary process shown in FIG. 2, the AI component 30 may have the information indicating whether or not the user wishes to provide feedback on the AI models.

As the user continues to use the search page 22, e.g. for searching one or more products, the server device 20 may perform product search and/or product recommendation. When the server device 20 performs product search and/or product recommendation, the server device 20 in cooperation with the AI component 30 may perform an information retrieval process such as an exemplary process shown in FIG. 6. The exemplary process shown in FIG. 6 may be performed for each session of product search or recommendation.

Figure 6:
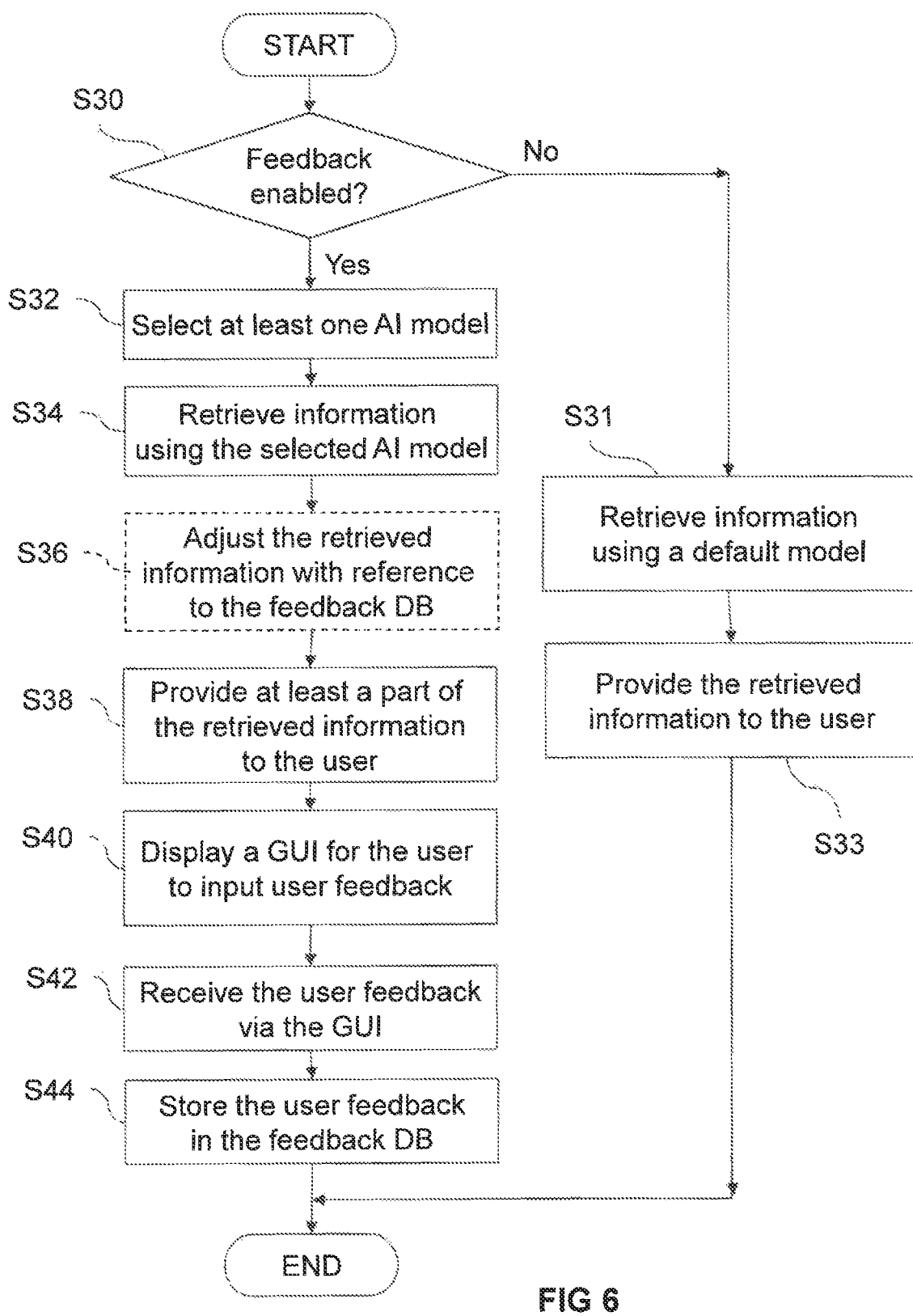
FIG. 6 shows a flowchart of a further exemplary process performed at the system shown in FIG. 1.

Referring to FIG. 6, at step S30, the server device 20 may determine whether or not the feedback is enabled by the AI component 30. For example, in case the AI component 30 stores a flag indicating whether or not the feedback is enabled, the server device 20 may refer to the flag stored by the AI component 30. Further, for example, the server device 20 may communicate with the AI component 30 to obtain the information indicating whether or not the feedback is enabled.

In case the feedback is not enabled (No at step S30), the server device 20 may retrieve information using a default AI model at step S31 and provide the retrieved information to the user at step S33. The default AI model used at step S31 may be a general AI model that is used by the server device 20 for product search or recommendation. In some examples, the default AI model used at step S31 may be a category specific model that is trained for the category of the products to be searched or recommended. After step S33, the exemplary process shown in FIG. 6 may end.

In case the feedback is enabled (Yes at step S30), the exemplary process may proceed to step S32. At step S32, the server device 20 may select at least one AI model from among a plurality of AI models available for retrieving information from the data storage 40. The selection may be based at least in part on an input made by the user of the client device 10. For example, in case the user has selected at least one AI model (see e.g., steps S14 and S16 of FIG. 2), the server device 20 may select, at step S32, the at least one AI model selected by the user. The at least one AI model selected by the user may be identified by referring to the user DB 38, for example. Further, for example, in case the user has not (yet) selected any AI model, the server device 20 may select at least one default AI model from among the plurality of available AI models. The at least one default AI model may be determined based on, for example, information relating to the user and/or category of the one or more items (e.g. products) for which the information retrieval is to be performed. In some examples, in case the user has not yet selected any AI model, the server device 20 may let the AI component 30 to perform the processing steps S14 and S16 of FIG. 2 for the user to select at least one AI model. The server device 20 may then select, at step S32 of FIG. 6, the at least one AI model selected by the user. In some examples, however, the server device 20 may select one or more AI models similar to the at least one AI model selected by the user, instead of selecting the one(s) selected by the user. This may be done with or without notifying the user. In such examples, in case negative user feedback is obtained (e.g., in the later step S42) for the AI model(s) similar to the one(s) selected, the server device 20 may assign, to the user, the at least one AI model selected by the user.

At step S34, the server device 20 may retrieve information using the at least one AI model selected at step S32. For example, the server device 20 may input, to the selected AI model(s), suitable input data and receive output data from the selected AI model(s). The input data may include, for example, search query, user identification information of the user of the client device 10, attribute data (e.g., gender, age, contact information, etc., obtained from the user DB 38), previous interest in products and search (e.g., obtained from the user DB 38), previous user feedback (e.g., obtained from the feedback DB 36), etc. The output data may include, for example, a list of items (e.g., products) to be provided to the user. The server device 20 may then retrieve from the data storage 40 information relating to the items included in the list. In some circumstances, the list of items included in the output data may be provided to the user as a list of recommended items (e.g., products), for example. Further, in some circumstances where a search is performed by the server device 20, the list of items included in the output data may be used for filtering and/or rearranging items included in a search result list. Further, in some exemplary embodiments, at least some of the AI models 32 for search may be trained to link search terms to items (e.g., products). The output data from such an AI model 32 may include, for example, a list of items to be provided to the user in response to input data including one or more search terms in the search query given by the user.

In case two or more AI models have been selected at step S32, the server device 20 may retrieve two or more sets of information at step S34, each set being retrieved by one of the two or more AI models. In case the server device 20 retrieves information at step S34 for product search, the AI component 30 may, in some circumstances, may modify the search query based on the user feedback stored in the feedback DB 36. The modification may include replacing or modifying one or more keywords in the search query and/or adding one or more keywords to the search query.

At step S36, the server device 20, in communication with the AI component 30, may optionally adjust the retrieved information with reference to the feedback DB 36. For instance, in case the retrieved information includes a list of items (e.g. products) as search result or recommendation, the items included in the list may be sorted and/or filtered based on the user feedback stored in the feedback DB 36. For example, one or more items for which the user gave lower evaluations in the past may be excluded from the list or given low priority within the list. Further, for example, the items in the list may be sorted in an order according to the evaluations given by the user in the past to the items in the list. It is noted that step S36 is an optional step that may be skipped in some exemplary embodiments.

At step S38, the server device 20 may provide at least a part of the retrieved information to the user. For example, the server device 20 may provide, for display at the client device 10, a list of products included in the retrieved information as a search result or recommendation. The list of products may be displayed within the search page 22, for example.

In case two or more AI models have been selected at step S32 and the server device 20 has retrieved at step S34 two or more sets of information, each set being retrieved by one of the two or more AI models, the server device 20 may combine the two or more sets of the retrieved information into a single set of information, when providing the retrieved information to the user at step S38. In such a case, the two or more sets of the retrieved information may be combined into the single set of information according to a rule indicating how to combine the two or more sets of the retrieved information. For example, the rule may indicate which of the two or more sets of the retrieved information should be incorporated in the single set of information to which extent. The rule may be a specified (e.g., predetermined or predeterminable) rule or may be determined according to a further machine learning model that is trained using the user feedback.

As a specific example of combining two or more sets of the retrieved information into a single set of information, assume that one AI model has returned as a search or recommendation result, e.g, a list of items P, L, A, T, Z, weighted in this order but with items A, T and Z having nearly the same weight. Further assume that the result from another AI model prefers item T over items Z and A with a higher weight. Then the combined result may be, for example: P, L, T, Z, A in the order of relevance.

As another specific example of combining two or more sets of the retrieved information into a single set of information, assume that the following AI models are assigned to a particular user: a user specific model that is created by the AI component 30 specifically for this particular user, different category specific models and recommended models. An example of specified rule for combining the results may be to include: 70% from the user specific model, 20% from a category specific model and 10% from a general model. In this specific example, a list with 10 items will have 7 products from the result of the user specific model, 2 from the category specific model and 1 from the general model. The items may be sorted by relevance so that the first 3 items are from the user specific model, 4th item from the category specific model, 5th, 6th and 7th from the user specific model, 8th from the general model and 9th from the user specific model and 10th from the category specific model, for example.

In the other specific example as stated above, in case a further AI model instead of the fixed rule is used for combining the results, the further AI model may be trained based on the user type, available model types, and feedback, for example. In such a case, for a specific user type (e.g. history and feedback data), and a specific category, the rule provided by the further AI to select the products may be different from the specified rule: 60% from the user specific model, 20% from a user specific category model, 10% from a general category model, 7% from one or more recommended models, 3% from the general model. The result, sorted by relevance, may also be different. The user specific category model may only be selected for this category. Within a different category, the result may be, e.g. 80% from a category specific model, 10% from a general model, 8% from one or more recommended models and 2% from the user specific model.

Figure 7:
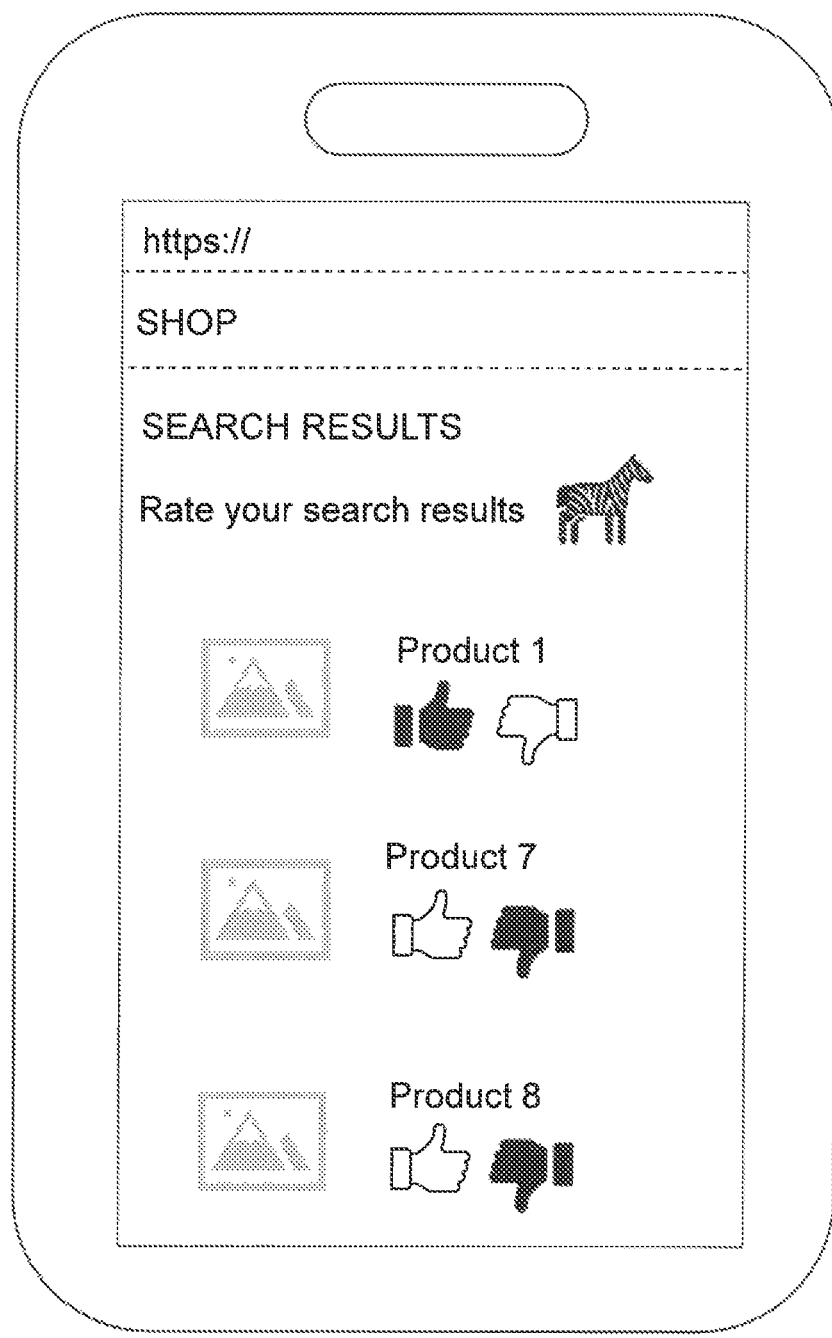
FIG. 7 shows an example of a GUI that may be provided for display during the exemplary process shown in FIG. 6.

Once (at least part of) the retrieved information is provided to the user at step S38, the user may provide user feedback on the retrieved information. In order to enable the user to give user feedback, at step S40, the AI component 30 in communication with the server device 20 may provide, for display at the client device 10, a GUI for the user to input user feedback on the retrieved information. The GUI may be provided within or in association with the search page 22. The GUI may include, for example, one or more elements for rating and/or evaluating each item in the list of items in the retrieved information provided at step S38. The examples of one or more elements for rating and/or evaluating each item may include, but are not limited to, a scale of 1 to 5 or 1 to 10, like and dislike buttons, multiple-choice questions, a symbol of a heart, etc. FIG. 7 shows an example of a GUI that may be provided for display at step S40. In some examples, the GUI displayed at step S40 may allow the user to swipe an image or an icon representing each item to left or right for like or dislike.

The user of the client device 10 may input user feedback via the GUI displayed on the client device 10 at step S40.

At step S42, the AI component 30 may receive the user feedback via the GUI provided for display at step S40.

At step S44, the AI component 30 may store the user feedback received at step S42 in the feedback DB 36 in association with the user and with the at least one AI model that is used for information retrieval at step S34. The exemplary process shown in FIG. 6 may end after step S44.

With the exemplary process shown in FIG. 6, user feedback of a user who participates in the feedback system can be collected and stored in the feedback DB 36. Using the collected user feedback, the AI component 30 may train (or retrain) the at least one AI model that has been used by the server device 20 for information retrieval and that has received the user feedback. In some examples, the training or retraining process may be performed every time new user feedback is stored in the feedback DB 36. In some other examples, the AI component 30 may wait for a specified amount of user feedback to be stored in association with a particular AI model (e.g., until the amount of the stored user feedback associated with the particular AI model exceeds a threshold) and then train or retrain the particular AI model with the specified amount of user feedback.

In some exemplary embodiments, the AI component 30 and the server device 20 may offer the user a possibility to receive alternative search and/or recommendation results using one or more AI models that are different from the one(s) used for search and/or recommendation results that are already provided to the user, e.g. according to the exemplary process shown in FIG. 6. In such exemplary embodiments, the AI component 30 and the server device 20 may perform an exemplary process shown in FIG. 8, for example.

Figure 8:
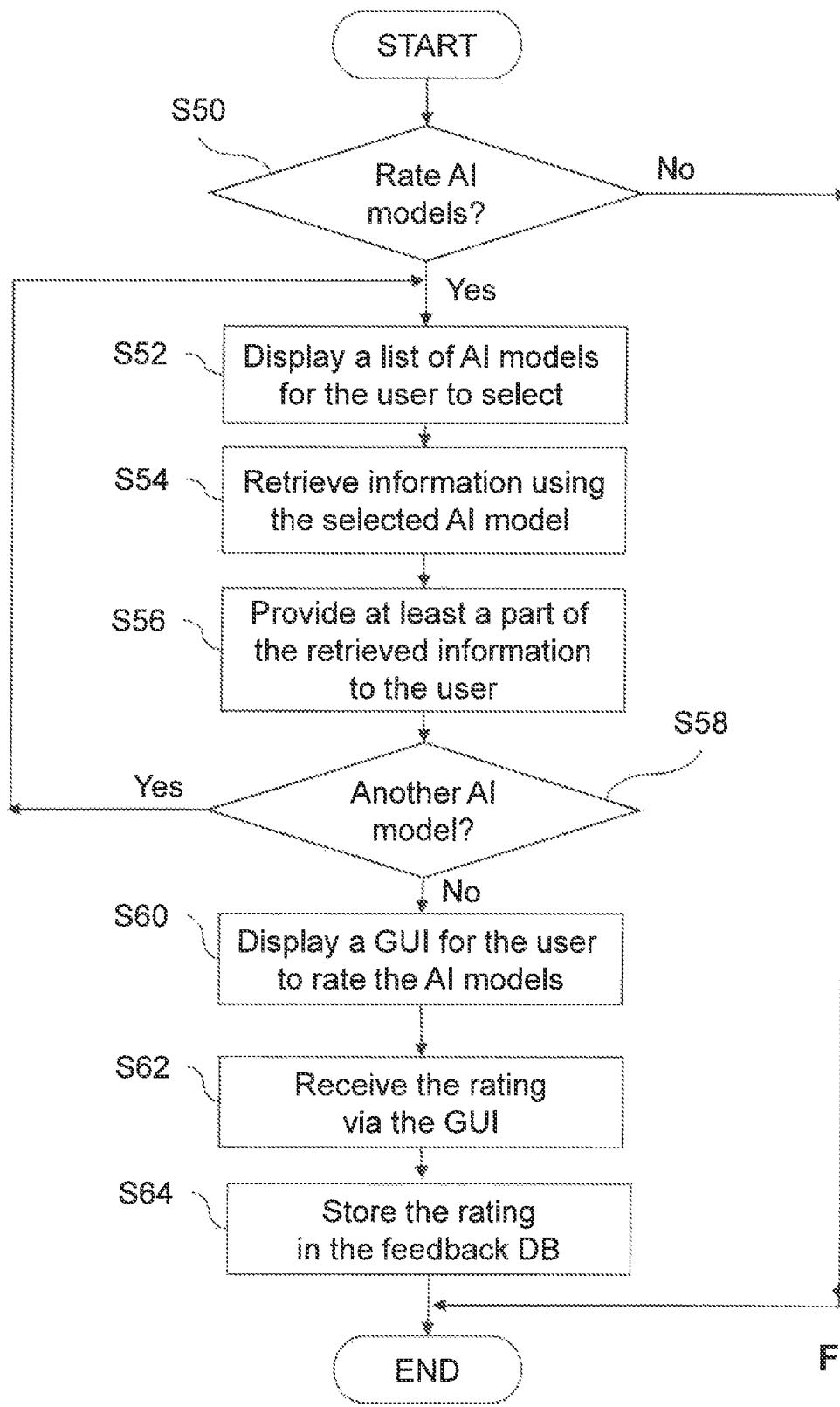
FIG. 8 shows a flowchart of a yet further exemplary process performed at the system shown in FIG. 1.

In some circumstances, the exemplary process shown in FIG. 8 may be performed after the exemplary process shown in FIG. 6 is performed. In some further circumstances, the exemplary process shown in FIG. 8 may be performed instead of the exemplary process shown in FIG. 6, for a user with whom the feedback is enabled.

Referring to FIG. 8, at step S50, the AI component 30 may determine whether or not to let the user rate two or more AI models. For example, the AI component 30 may provide for display a GUI to request the user to indicate whether or not the user wishes to rate two or more AI models. If the user makes an input indicating that the user does not wish to rate two or more AI models, the AI component 30 may determine not to let the user rate two or more AI models (No at step S50) and the exemplary process shown in FIG. 8 may end. If the user makes an input indicating that the user wishes to rate two or more AI models, the AI component 30 may determine to let the user rate two or more AI models (Yes at step S50) and the exemplary process shown in FIG. 8 may proceed to step S52.

Figure 9:
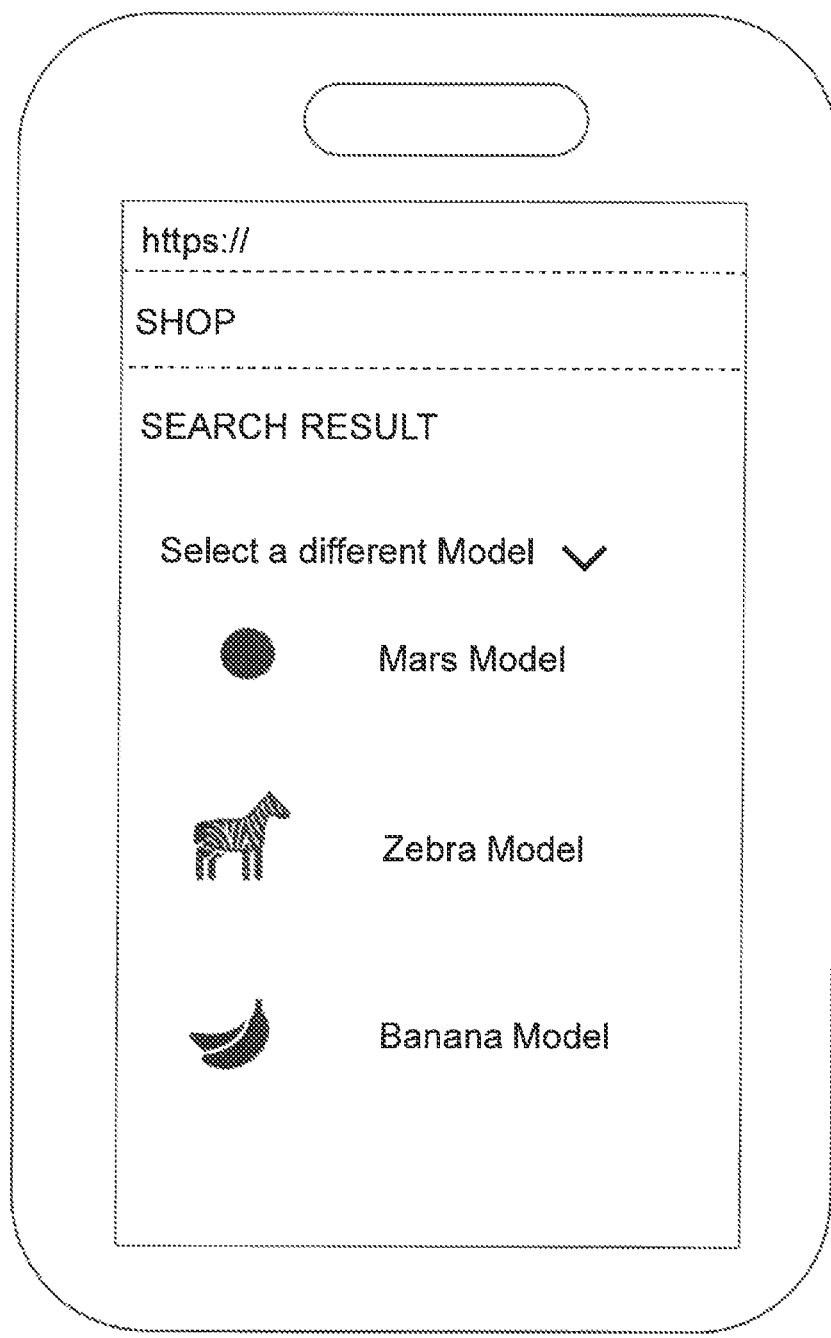
FIGS. 9 and 10 show examples of GUIs that may be provided for display during the exemplary process shown in FIG. 8.

At step S52, the AI component 30 may display a list of AI models for the user to select. For example, the AI component 30 may provide, for display at the client device 10, a GUI including a list of AI models that have not yet been used for information retrieval for that particular user in the current session of product search or recommendation. The GUI may be provided within or in association with the search page 22. FIG. 9 shows an example of a GUI that may be provided for display at step S52 of FIG. 8.

Referring again to FIG. 8, the user may select at least one AI model from the list of AI models displayed at step S52.

At step S54, the server device 20 may retrieve information using the AI model selected by the user. The information retrieval at step S54 may be performed in a manner analogous to that at step S34 of FIG. 6.

At step S56, the server device 20 may provide at least a part of the retrieved information to the user. The provision of the at least a part of the retrieved information at step S56 may be performed in a manner analogous to that at step S38 of FIG. 6. In some examples, adjustment of the retrieved information with reference to the feedback DB 36 as performed in step S36 of FIG. 6 may be performed before step S56 of FIG. 8.

At step S58, the AI component 30 may determine whether another AI model is subject to rating by the user. For example, the AI component 30 may provide, for display at the client device 10, a GUI to request the user to input an indication whether or not the user wishes to rate another AI model. If the user makes an input indicating that the user wishes to rate another AI model, the AI component 30 may determine that another AI model is subject to rating (Yes at step S58) and the exemplary process shown in FIG. 8 may return to step S52. If the user makes an input indicating that the user does not wish to rate another AI model, the AI component 30 may determine that no more AI model is subject to rating (No at step S58) and the exemplary process shown in FIG. 8 may proceed to step S60.

Figure 10:
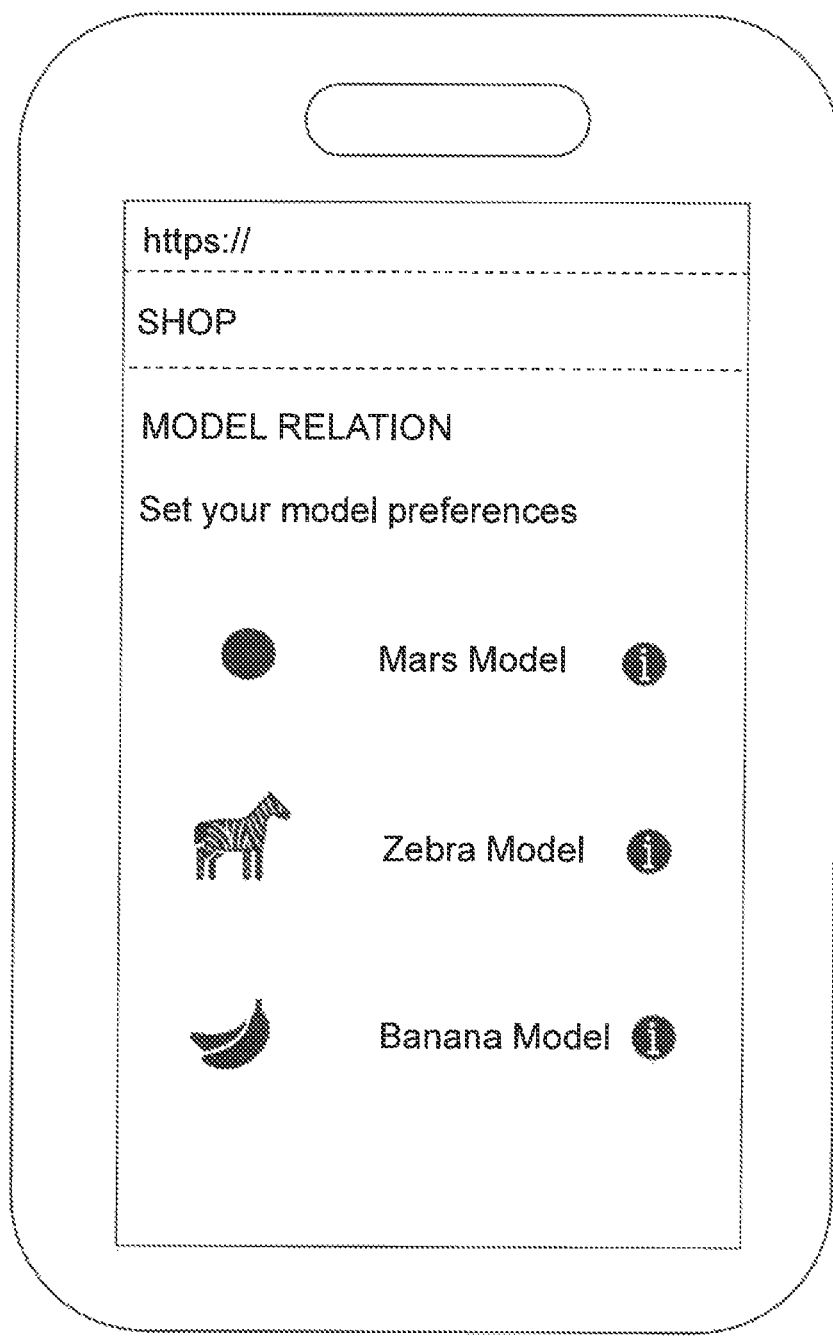

At step S60, the AI component 30 may provide, for display at the client device 10, a GUI for the user to rate the AI models. When the exemplary process shown in FIG. 8 reaches step S60, the server device 20 has provided two or more sets of retrieved information to the user, each of the two or more sets of retrieved information being obtained using one of two or more AI models selected by the user. The GUI displayed at step S60 may include a list of the two or more machine learning models used for retrieving the two or more sets of retrieved information. Further, the GUI may include one or more elements for the user to provide user feedback including an evaluation made by the user for at least one of the two or more AI models and/or preferences of the user for the two or more AI models. For example, as shown in FIG. 10, the GUI displayed at step S60 may allow the user to rate the AI models relative to other AI models in the list.

At step S62, the AI component 30 may receive the user feedback including the rating of the AI models via the GUI displayed at step S60.

At step S64, the AI component 30 may store the user feedback received at step S62 in the feedback DB 36.

After step S64, the exemplary process shown in FIG. 8 may end.

It should be noted that FIG. 8 is a mere example of a process that may be performed by the AI component 30 and the server device 20 in case of allowing the user to rate two or more AI models. A process that is different from FIG. 8 may also be performed for the user to rate two or more AI models. For example, the AI component 30 may display a GUI for the user to input user feedback on each item included in the retrieved information provided at step S56 of FIG. 8 and further store the user feedback in the feedback DB 36. Further, in some examples, the AI component 30 may display a GUI to allow the user to indicate the best products or recommendations in an overview including all the products or recommendations provided in the two or more sets of retrieved information obtained using the two or more AI models subject to rating.

Figure 11:
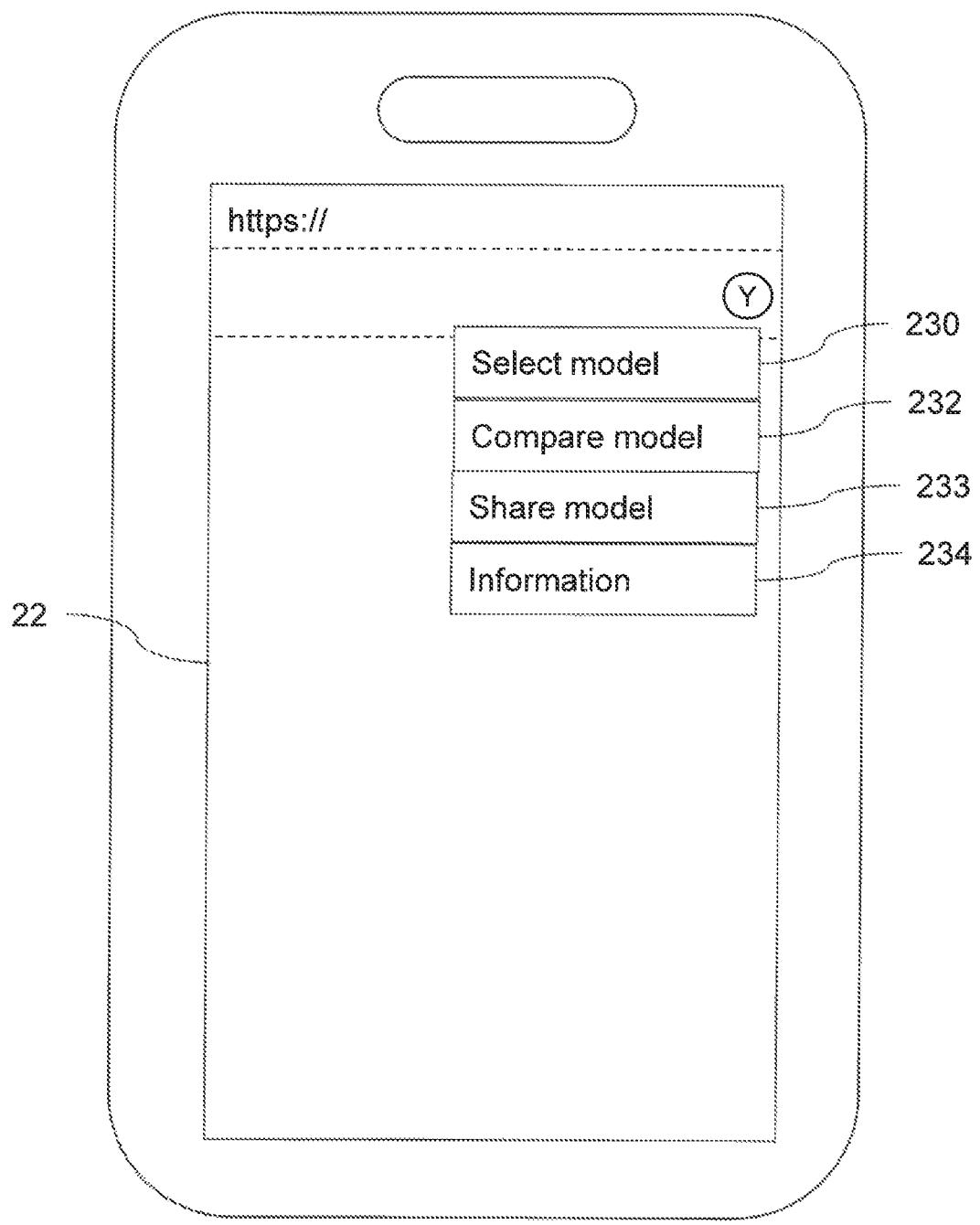
FIG. 11 shows an example of a GUI that may be provided for display.

In some circumstances, exemplary processes involving the AI component 30 such as the selection of the AI model(s) by the user as described above with reference to FIG. 2 and comparison of two or more AI models as described above with reference to FIG. 8 may be performed in response to an explicit user input to perform one of the exemplary processes. For example, the AI component 30 may be incorporated into interactive user interface (UI) components on the search page 22. FIG. 11 shows an example of such UI components. In FIG. 11, UI components 230, 232, 233 and 234 respectively correspond to an exemplary process of selection of the AI model(s) by the user, an exemplary process of comparison of two or AI models, allowing a user to recommend one or more AI models to another user, and provision of information on the AI models and/or the feedback system. When the user clicks on one of these UI components, the AI component 30 may perform the corresponding process. For example, when the user clicks on the UI component 230, "Select model", an exemplary process including steps S14 and S16 of FIG. 2 to allow the user to select the AI model(s) may be performed. Further, when the user clicks on the UI component 232, "Compare model", the exemplary process as shown in FIG. 8 for comparing the AI models may be performed, for example. Further, when the user clicks on the UI component 233, "Share model", the AI component 30 may, for example, display a list of AI models that may be recommended by the user to another user, receive a user input specifying which AI model(s) is (are) recommend to which user(s) and then provide identification information of the recommended AI model(s) to the specified user(s), e.g., in the form of a link as stated above. Further, for example, when the user clicks on the UI component 234, "Information", the AI component 30 may provide, for display at the client device 10, a GUI including information on the AI models and/or the feedback system.

Hardware Configuration

Figure 12:
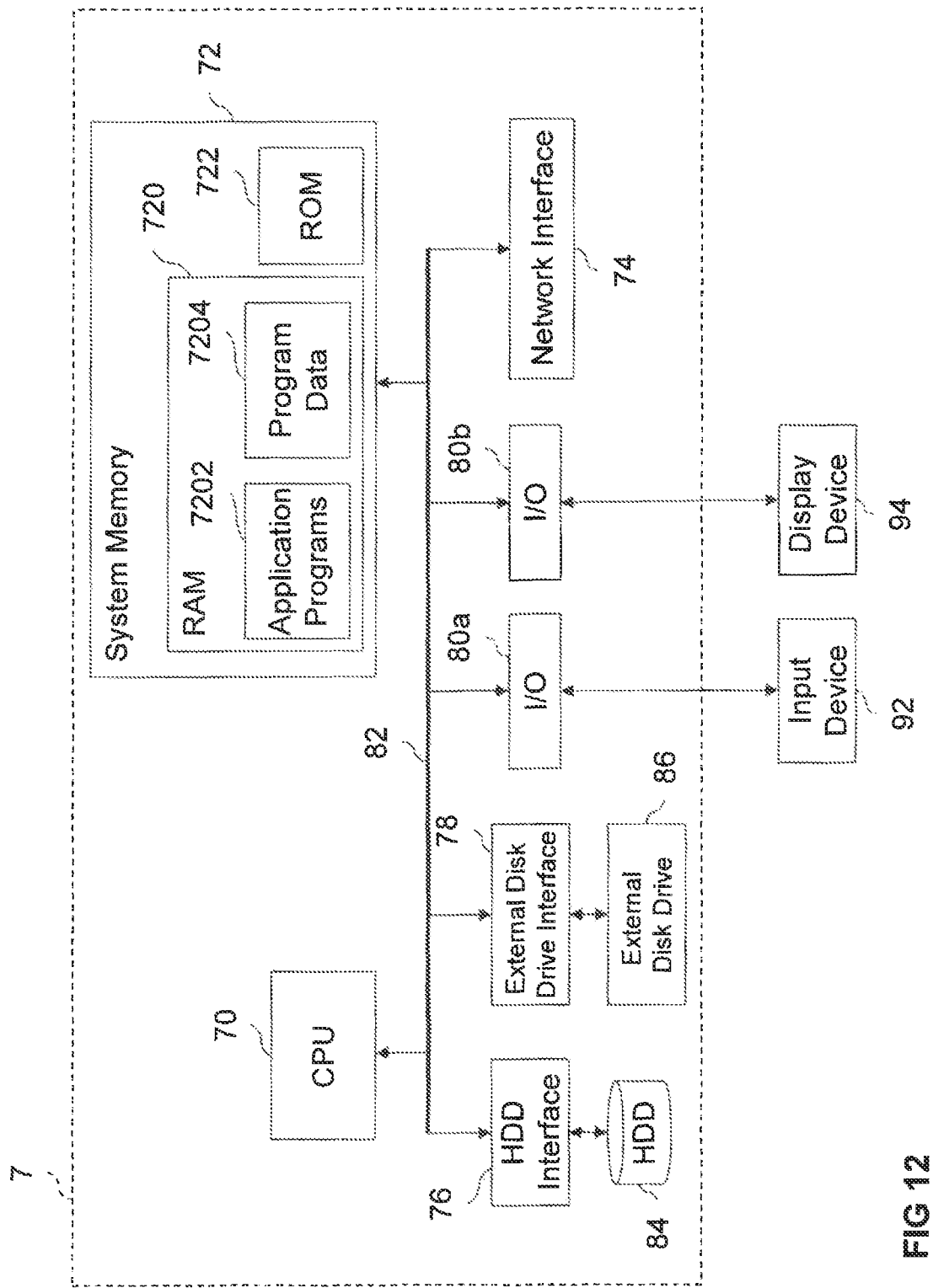
FIG. 12 shows an exemplary hardware configuration of a computer that may be used to implement exemplary embodiments and variations as described herein.

FIG. 12 shows an exemplary hardware configuration of a computer that may be used to implement exemplary embodiments and variations as described herein.

The computer 7 shown in FIG. 12 includes a CPU 70, a system memory 72, a network interface 74, a hard disk drive (HDD) interface 76, an external disk drive interface 78 and input/output (I/O) interfaces 80. These components of the computer are coupled to each other via a system bus 82. The CPU 70 may perform arithmetic, logic and/or control operations by accessing the system memory 72. The CPU 70 may implement the processors of the exemplary devices and/or system described above. The system memory 72 may store information and/or instructions for use in combination with the CPU 70. The system memory 72 may include volatile and non-volatile memory, such as a random access memory (RAM) 720 and a read only memory (ROM) 722. A basic input/output system (BIOS) containing the basic routines that helps to transfer information between elements within the computer 7, such as during start-up, may be stored in the ROM 722. The system bus 82 may be any of several types of bus structures including a memory bus or memory controller, a peripheral bus, and a local bus using any of a variety of bus architectures.

The computer may include a network interface 74 for communicating with other computers and/or devices via a network.

Further, the computer may include a hard disk drive (HDD) 84 for reading from and writing to a hard disk (not shown), and an external disk drive 86 for reading from or writing to a removable disk (not shown). The removable disk may be a magnetic disk for a magnetic disk drive or an optical disk such as a CD ROM for an optical disk drive. The HDD 84 and the external disk drive 86 are connected to the system bus 82 by a HDD interface 76 and an external disk drive interface 78, respectively. The drives and their associated computer-readable media provide non-volatile storage of computer-readable instructions, data structures, program modules and other data for the general purpose computer. The relevant data may be organized in a database, for example a relational database, an object database or a NoSQL database.

Although the exemplary environment described herein employs a hard disk (not shown) and an external disk (not shown), it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 722 or RAM 720, including an operating system (not shown), one or more application programs 7202, other program modules (not shown), and program data 7204. The application programs may include at least a part of the functionality as described above.

The computer 7 may be connected to an input device 92 such as mouse and/or keyboard and a display device 94 such as liquid crystal display, via corresponding I/O interfaces 80a and 80b as well as the system bus 82. In case the computer 7 is implemented as a tablet computer, for example, a touch panel that displays information and that receives input may be connected to the computer 7 via a corresponding I/O interface and the system bus 82. Further, in some examples, although not shown in FIG. 12, the computer 7 may further be connected to a printer and/or an imaging device such as a camera, via corresponding I/O interfaces and the system bus 82.

In addition or as an alternative to an implementation using a computer 7 as shown in FIG. 12, a part or all of the functionality of the exemplary embodiments described herein may be implemented as one or more hardware circuits. Examples of such hardware circuits may include but are not limited to: Large Scale Integration (LSI), Reduced Instruction Set Circuits (RISC), Application Specific Integrated Circuit (ASIC) and Field Programmable Gate Array (FPGA).

What is claimed is:

1. An information retrieval system comprising:
a client device;
a server device connected to the client device, the server device being configured to retrieve information from a data storage;
an artificial intelligence (AI) component, in communication with the client device and the server device, the AI component comprising at least a processor; and
a feedback database accessible by the AI component;
wherein the server device is configured to:
    receive an input from a user of the client device, the user input comprising a user selection of at least one machine learning model, from among a plurality of machine learning models that are available for retrieving information from the data storage;
    retrieve information from the data storage using the at least one machine learning model; and
    provide at least a part of the retrieved information to the client device; and wherein the AI component is configured to:
    provide, for display at the client device, a graphical user interface, GUI, for the user to input user feedback on the retrieved information;
    receive the user feedback via the GUI; and
    store, in the feedback database, the received user feedback in association with the user and with the at least one machine learning model used for retrieving the information.

2. The system according to claim 1, wherein the AI component is further configured to train, using the user feedback, the at least one machine learning model used for retrieving the information.

3. The system according to claim 2, wherein the input from the user includes identification information of the user, and
wherein the server device may be further configured to provide, for display at the client device, a GUI for the user to input the identification information of the user.

4. The system according to claim 1, wherein the server device is further configured to, for receiving the input from the user, provide, for display at the client device, a GUI including a list of the plurality of machine learning model that are available for retrieving information from the storage device; and
wherein the input from the user specifies the at least one machine learning model to be selected for retrieving the information.

5. The system according to claim 2, wherein the AI component is further configured to, when the user feedback from a plurality of users is stored in the feedback database, cluster the plurality of users based on the user feedback; and
wherein the selecting of the at least one machine learning model by the server device is performed further based on which cluster the user who made the input belongs to.

6. The system according to claim 5, wherein the server device is configured to:
when selecting the at least one machine learning model, select two or more machine learning models from among the plurality of machine learning models; and
when providing at least a part of the retrieved information to the client device, provide two or more sets of the retrieved information, each of the two or more sets of the retrieved information being retrieved using one of the two or more machine learning models; and
wherein the GUI provided for display at the client device by the AI component includes a list of the two or more machine learning models; and
wherein the user feedback includes:
an evaluation made by the user for at least one of the two or more machine learning models; and/or
preferences of the user for the two or more machine learning models.

7. The system according to claim 1, wherein the plurality of machine learning models that are available for retrieving information from the data storage comprise one or more of:
a category specific model that is trained with respect to a particular category of information stored in the data storage;
a user specific model that is trained with respect to a particular user or a particular type of users;
a recommended model that is recommended, by a user different from the user who made the input, to the user who made the input, and
wherein the AI component may be further configured to create the category specific model, the user specific model and/or the recommended model according to a transfer learning algorithm, based on an existing model, using the user feedback stored in the feedback database.

8. A computer-implemented method for information retrieval, comprising:
receiving, by a server device configured to retrieve information from a data storage, an input from a user via a client device connected to the server device;
selecting, by the server device, at least one machine learning model, based at least in part on the input from the user, the user input comprising a user selection of the at least one machine learning model from among a plurality of machine learning models that are available for retrieving information from the data storage;
retrieving, by the server device, information from the data storage using the at least one machine learning model;
providing, by the server device, at least a part of the retrieved information to the client device,
providing, by an AI component in communication with the client device and the server device, for display at the client device, a graphical user interface, GUI, for the user to input user feedback on the retrieved information, the AI component comprising at least a processor;
receiving, by the AI component, the user feedback via the GUI; and
storing, by the AI component, in a feedback database accessible by the AI component, the received user feedback in association with the user and with the at least one machine learning model used for retrieving the information.

9. The method according to claim 8, further comprising:
training, by the AI component, using the user feedback, the at least one machine learning model used for retrieving the information.

10. The method according to claim 8, wherein the input from the user includes identification information of the user, and
wherein the method may further comprise providing, for display at the client device, a GUI for the user to input the identification information of the user.

11. The method according to claim 8, wherein the method further comprises providing, by the server device for receiving the input from the user, for display at the client device, a GUI including a list of the plurality of machine learning models that are available for retrieving information from the storage device; and
wherein the input from the user specifies the at least one machine learning model to be selected for retrieving the information.

12. The method according to claim 10, wherein the method further comprises, when the user feedback from a plurality of users is stored in the feedback database, clustering, by the AI component, the plurality of users based on the user feedback; and
wherein the selecting of the at least one machine learning model by the server device is performed further based on which cluster the user who made the input belongs to.

13. The method according to claim 12, wherein two or more machine learning models are selected by the server device from among the plurality of machine learning models;
wherein, when providing at least a part of the retrieved information to the client device, two or more sets of the retrieved information are provided by the server device, each of the two or more sets of the retrieved information being retrieved using one of the two or more machine learning models;
wherein the GUI provided for display at the client device by the AI component includes a list of the two or more machine learning models; and
wherein the user feedback includes:
an evaluation made by the user for at least one of the two or more machine learning models; and/or preferences of the user for the two or more machine learning models.

14. The method according to claim 8, wherein the plurality of machine learning models that are available for retrieving information from the data storage comprise one or more of:
  a category specific model that is trained with respect to a particular category of information stored in the data storage;
  a user specific model that is trained with respect to a particular user or a particular type of users;
  a recommended model that is recommended, by a user different from the user who made the input, to the user who made the input, and
  wherein the category specific model, the user specific model and/or the recommended model may be created according to a transfer learning algorithm, based on an existing model, using the user feedback stored in the feedback database.

15. A computer-readable medium storing computer-readable instructions that, when loaded and run on a computer, cause the computer to:
  receive, by a server device configured to retrieve information from a data storage, an input from a user via a client device connected to the server device;
  select, by the server device, at least one machine learning model, based at least in part on the input from the user, the user input comprising a user selection of the at least one machine learning model from among a plurality of machine learning models that are available for retrieving information from the data storage;
  retrieve, by the server device, information from the data storage using the at least one machine learning model;
  provide, by the server device, at least a part of the retrieved information to the client device,
  provide, by an AI component in communication with the client device and the server device, for display at the client device, a graphical user interface, GUI, for the user to input user feedback on the retrieved information, the AI component comprising at least a processor;
  receive, by the AI component, the user feedback via the GUI; and
  store, by the AI component, in a feedback database accessible by the AI component, the received user feedback in association with the user and with the at least one machine learning model used for retrieving the information.

16. The medium according to claim 15, the computer-readable instructions, when loaded and run on a computer, cause the computer to:
  train, by the AI component, using the user feedback, the at least one machine learning model used for retrieving the information.

17. The medium according to claim 15, the computer-readable instructions, when loaded and run on a computer, cause the computer to:
  provide, by the server device for receiving the input from the user, for display at the client device, a GUI including a list of the plurality of machine learning models that are available for retrieving information from the storage device; and
  wherein the input from the user specifies the at least one machine learning model to be selected for retrieving the information.

18. The medium according to claim 16, the computer-readable instructions, when loaded and run on a computer, cause the computer to:
  when the user feedback from a plurality of users is stored in the feedback database, clustering, by the AI component, the plurality of users based on the user feedback; and
  wherein the selecting of the at least one machine learning model by the server device is performed further based on which cluster the user who made the input belongs to.

19. The medium according to claim 18, wherein two or more machine learning models are selected by the server device from among the plurality of machine learning models;
  wherein, when providing at least a part of the retrieved information to the client device, two or more sets of the retrieved information are provided by the server device, each of the two or more sets of the retrieved information being retrieved using one of the two or more machine learning models;
  wherein the GUI provided for display at the client device by the AI component includes a list of the two or more machine learning models; and
  wherein the user feedback includes:
    an evaluation made by the user for at least one of the two or more machine learning models; and/or
    preferences of the user for the two or more machine learning models.

20. The medium according to claim 15, wherein the plurality of machine learning models that are available for retrieving information from the data storage comprise one or more of:
  a category specific model that is trained with respect to a particular category of information stored in the data storage;
  a user specific model that is trained with respect to a particular user or a particular type of users;
  a recommended model that is recommended, by a user different from the user who made the input, to the user who made the input, and
  wherein the category specific model, the user specific model and/or the recommended model may be created according to a transfer learning algorithm, based on an existing model, using the user feedback stored in the feedback database.

* * * * *